United States Patent
Zhou et al.

(10) Patent No.: US 10,771,131 B2
(45) Date of Patent: Sep. 8, 2020

(54) SPLIT PRECODING AND SPLIT PREFILTERING BETWEEN A CENTRAL UNIT AND A DISTRIBUTED UNIT OF A GENERATION NODE-B (GNB)

(71) Applicant: Apple Inc., Cupertino, CA (US)

(72) Inventors: Feng Zhou, Beijing (CN); Yushu Zhang, Beijing (CN); Xiaowen Zhang, Shanghai (CN); Wenting Chang, Beijing (CN); Qian Li, Beaverton, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/100,773

(22) Filed: Aug. 10, 2018

(65) Prior Publication Data
US 2019/0044580 A1    Feb. 7, 2019

Related U.S. Application Data

(60) Provisional application No. 62/543,864, filed on Aug. 10, 2017.

(51) Int. Cl.
| | |
|---|---|
| *H04B 7/0456* | (2017.01) |
| *H04B 7/026* | (2017.01) |
| *H04L 5/00* | (2006.01) |
| *H04W 72/08* | (2009.01) |
| *H04B 7/0417* | (2017.01) |

(Continued)

(52) U.S. Cl.
CPC ............. *H04B 7/046* (2013.01); *H04B 7/022* (2013.01); *H04B 7/026* (2013.01); *H04B 7/0417* (2013.01); *H04B 7/0456* (2013.01); *H04L 5/0051* (2013.01); *H04W 72/085* (2013.01); *H04B 7/0615* (2013.01); *H04B 7/0626* (2013.01); *H04W 72/14* (2013.01)

(58) Field of Classification Search
CPC ... H04L 5/0048; H04L 5/0007; H04L 5/0051; H04L 1/0031; H04L 1/1854; H04L 25/0224; H04B 7/0626; H04B 7/0695; H04B 7/0456; H04B 7/0417; H04B 17/309; H04B 7/026; H04B 7/0404; H04B 7/046; H04B 7/0632; H04B 17/318; H04B 7/022; H04W 72/042; H04W 52/243; H04W 56/001; H04W 72/1215; H04W 72/085

See application file for complete search history.

(56) References Cited

U.S. PATENT DOCUMENTS

| | | | |
|---|---|---|---|
| 10,368,334 B2* | 7/2019 | Park | H04W 68/025 |
| 2018/0034515 A1* | 2/2018 | Guo | H04B 7/043 |

(Continued)

*Primary Examiner* — Khanh C Tran
(74) *Attorney, Agent, or Firm* — Kowert, Hood, Munyon, Rankin & Goetzel, P.C.

(57) ABSTRACT

Embodiments of a Generation Node-B (gNB) and methods of communication are disclosed herein. The gNB may be configured with logical nodes including a gNB central unit (gNB-CU) and a gNB distributed unit (gNB-DU). The gNB-CU 106 may determine a first precoding matrix and a second precoding matrix for a precoding of one or more data streams for transmission on a plurality of antennas coupled to the gNB-DU. The precoding may be in accordance with a split functionality between the gNB-CU and the gNB-DU that includes: precoding by the gNB-CU with the first precoding matrix, and precoding by the gNB-DU with the second precoding matrix.

22 Claims, 11 Drawing Sheets

(51) Int. Cl.
  *H04B 7/022* (2017.01)
  *H04W 72/14* (2009.01)
  *H04B 7/06* (2006.01)

(56) References Cited

U.S. PATENT DOCUMENTS

| | | | |
|---|---|---|---|
| 2018/0091197 A1* | 3/2018 | Huang | H04B 7/0456 |
| 2018/0092156 A1* | 3/2018 | Kim | H04W 76/27 |
| 2018/0146433 A1* | 5/2018 | Zhang | H04W 52/06 |
| 2018/0227101 A1* | 8/2018 | Park | H04W 52/18 |
| 2018/0227103 A1* | 8/2018 | Wang | H04L 5/0055 |
| 2018/0234152 A1* | 8/2018 | Miyamoto | H04B 7/0626 |
| 2019/0037631 A1* | 1/2019 | Byun | H04W 76/25 |

* cited by examiner

SPLIT PRECODING AND SPLIT PREFILTERING BETWEEN A CENTRAL UNIT AND A DISTRIBUTED UNIT OF A GENERATION NODE-B (GNB)

PRIORITY CLAIM

This application claims priority under 35 USC 119(e) to U.S. Provisional Patent Application Ser. No. 62/543,864, filed Aug. 10, 2017, which is incorporated herein by reference in its entirety.

TECHNICAL FIELD

Embodiments pertain to wireless communications. Some embodiments relate to cellular communication networks including 3GPP (Third Generation Partnership Project) networks, 3GPP LTE (Long Term Evolution) networks, 3GPP LTE-A (LTE Advanced) networks, New Radio (NR) networks, and 5G networks, although the scope of the embodiments is not limited in this respect. Some embodiments related to disaggregated Generation Node-Bs (gNBs). Some embodiments relate to precoding, including split precoding between components. Some embodiments relate to prefiltering, including split prefiltering between components.

BACKGROUND

Base stations and mobile devices operating in a cellular network may exchange data. Functionality related to various protocol layers may be implemented in a base station to support communication with mobile devices. In an example scenario, a large number of mobile devices may communicate with the base station. In another example scenario, performance targets for a mobile device, such as latency, delay and/or other, may be challenging for the base station to meet. Accordingly, there is a general need for methods and systems to implement communication between the base station and the mobile devices in these and other scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
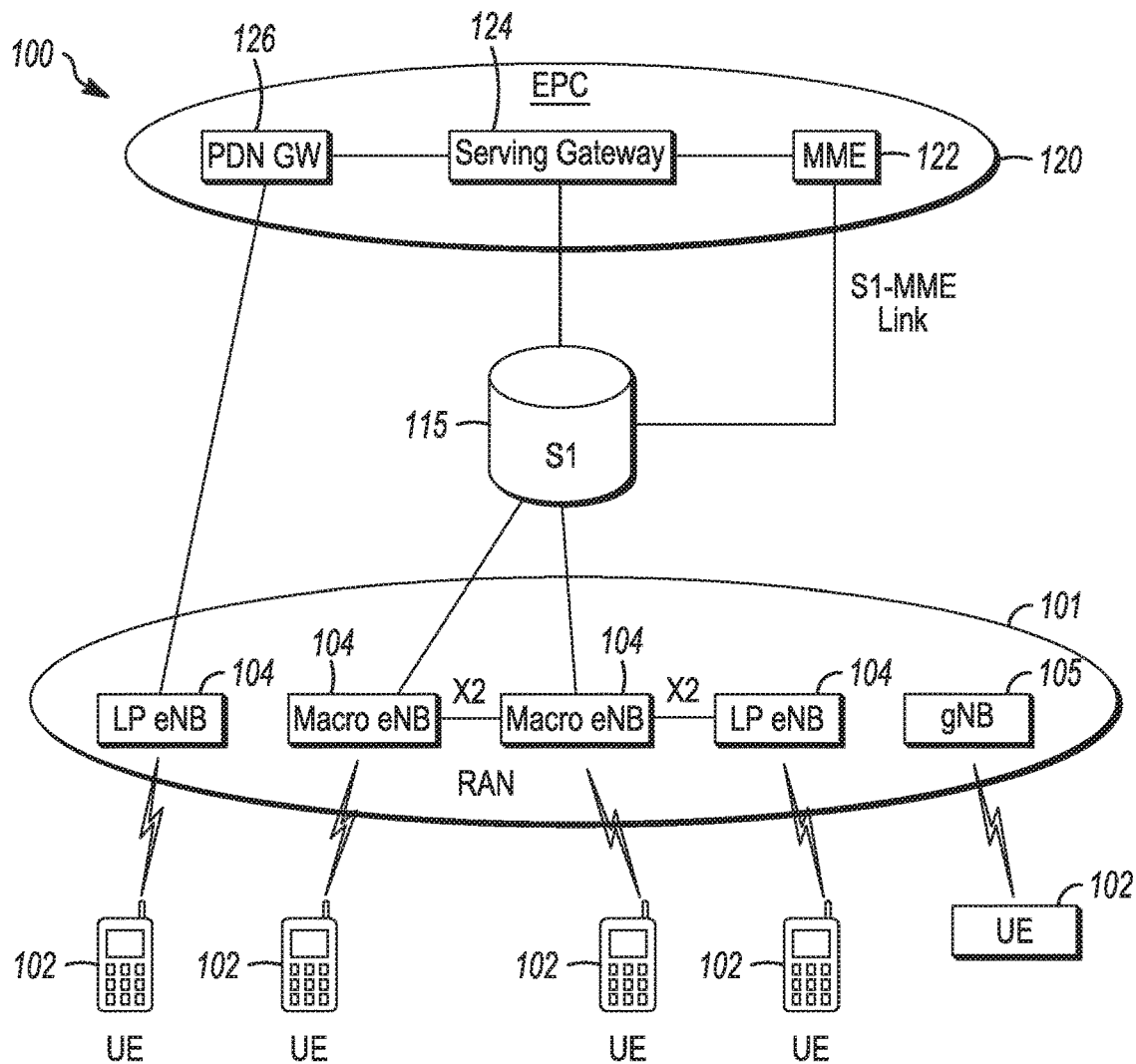
FIG. 1A is a functional diagram of an example network in accordance with some embodiments.
Figure 1A:
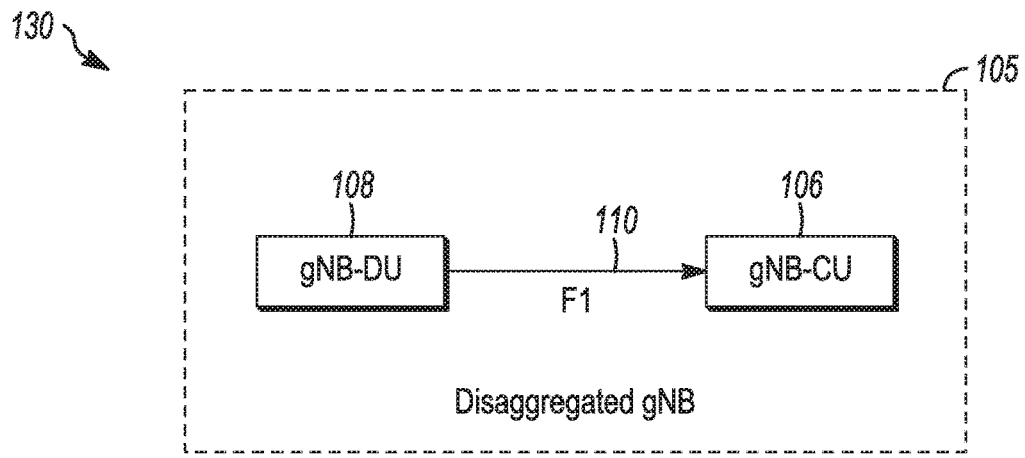
Figure 1B:
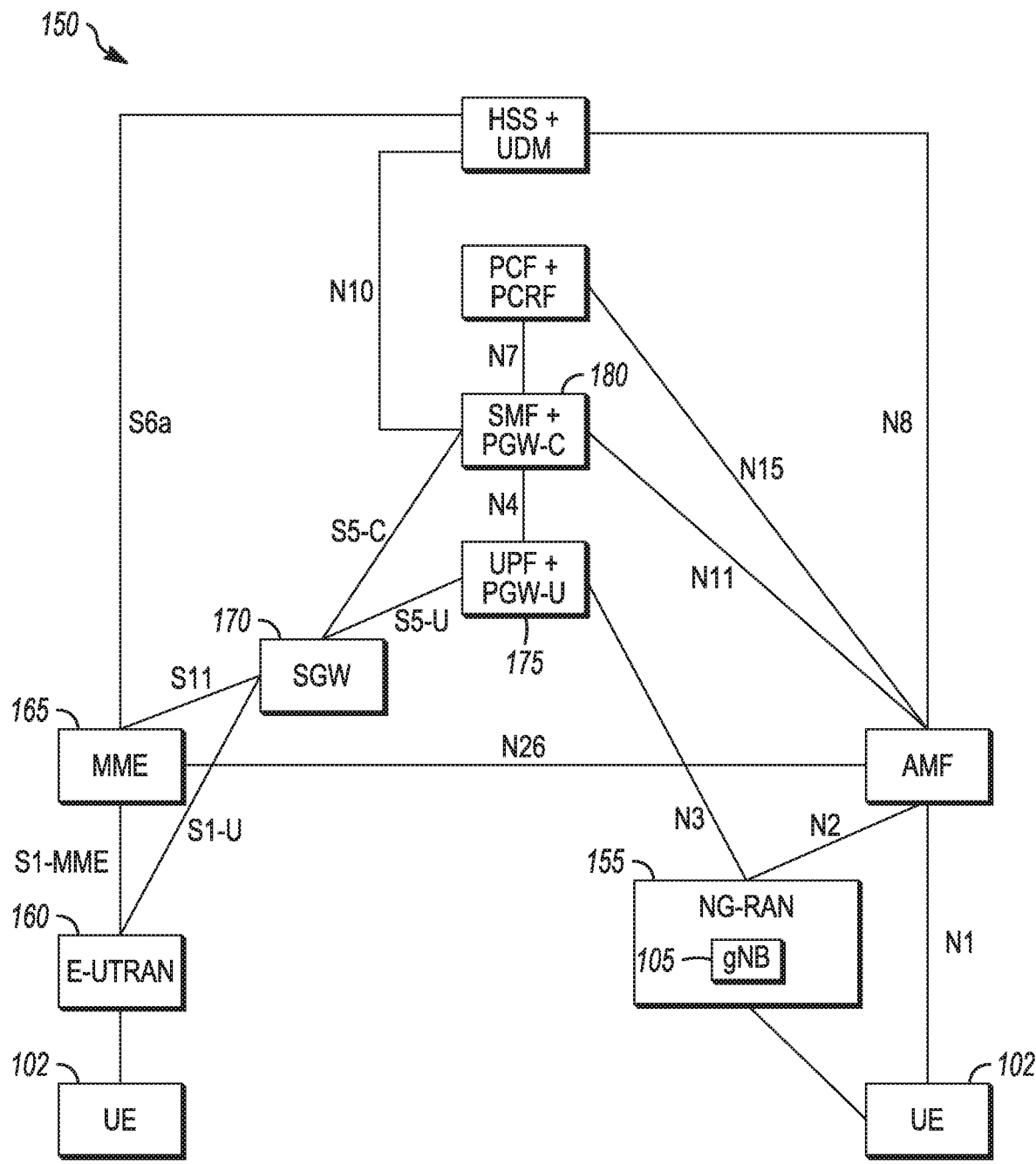
FIG. 1B is a functional diagram of another example network in accordance with some embodiments.

FIG. 1A is a functional diagram of an example network in accordance with some embodiments. FIG. 1B is a functional diagram of another example network in accordance with some embodiments. In references herein, "FIG. 1" may include FIG. 1A and FIG. 1B. In some embodiments, the network 100 may be a Third Generation Partnership Project (3GPP) network. In some embodiments, the network 150 may be a 3GPP network. In a non-limiting example, the network 150 may be a new radio (NR) network. It should be noted that embodiments are not limited to usage of 3GPP networks, however, as other networks may be used in some embodiments. As an example, a Fifth Generation (5G) network may be used in some cases. As another example, a New Radio (NR) network may be used in some cases. As another example, a wireless local area network (WLAN) may be used in some cases. Embodiments are not limited to these example networks, however, as other networks may be used in some embodiments. In some embodiments, a network may include one or more components shown in FIG. 1A. Some embodiments may not necessarily include all components shown in FIG. 1A, and some embodiments may include additional components not shown in FIG. 1A. In some embodiments, a network may include one or more components shown in FIG. 1B. Some embodiments may not necessarily include all components shown in FIG. 1B, and some embodiments may include additional components not shown in FIG. 1B. In some embodiments, a network may include one or more components shown in FIG. 1A and one or more components shown in FIG. 1B. In some embodiments, a network may include one or more components shown in FIG. 1A, one or more components shown in FIG. 1B and one or more additional components.

The network 100 may comprise a radio access network (RAN) 101 and the core network 120 (e.g., shown as an evolved packet core (EPC)) coupled together through an S1 interface 115. For convenience and brevity sake, only a portion of the core network 120, as well as the RAN 101, is shown. In a non-limiting example, the RAN 101 may be an evolved universal terrestrial radio access network (E-UTRAN). In another non-limiting example, the RAN 101 may include one or more components of a New Radio (NR) network. In another non-limiting example, the RAN 101 may include one or more components of an E-UTRAN and one or more components of another network (including but not limited to an NR network).

The core network 120 may include a mobility management entity (MME) 122, a serving gateway (serving GW) 124, and packet data network gateway (PDN GW) 126. In some embodiments, the network 100 may include (and/or support) one or more Evolved Node-B's (eNBs) 104 (which may operate as base stations) for communicating with User Equipment (UE) 102. The eNBs 104 may include macro eNBs and low power (LP) eNBs, in some embodiments.

In some embodiments, the network 100 may include (and/or support) one or more Next Generation Node-B's (gNBs) 105. In some embodiments, one or more eNBs 104 may be configured to operate as gNBs 105. Embodiments are not limited to the number of eNBs 104 shown in FIG. 1A or to the number of gNBs 105 shown in FIG. 1A. In some embodiments, the network 100 may not necessarily include eNBs 104. Embodiments are also not limited to the connectivity of components shown in FIG. 1A.

It should be noted that references herein to an eNB 104 or to a gNB 105 are not limiting. In some embodiments, one or more operations, methods and/or techniques (such as those described herein) may be practiced by a base station component (and/or other component), including but not limited to a gNB 105, an eNB 104, a serving cell, a transmit receive point (TRP) and/or other. In some embodiments, the base station component may be configured to operate in accordance with a New Radio (NR) protocol and/or NR standard, although the scope of embodiments is not limited in this respect. In some embodiments, the base station component may be configured to operate in accordance with a Fifth Generation (5G) protocol and/or 5G standard, although the scope of embodiments is not limited in this respect.

In some embodiments, the gNB 105 may include multiple components. In a non-limiting example shown in 130, the gNB 105 may comprise one or more of: a gNB central unit (gNB-CU) 106, a gNB distributed unit (gNB-DU) 108 and/or other component(s). The gNB-CU 106 and the gNB-DU 108 may communicate over the F1 interface 110, although the scope of embodiments is not limited in this respect. It should be noted that the gNB-CU 106 may be referred to herein as the CU 106, in some cases. In addition, the gNB-DU 108 may be referred to herein as the DU 108, in some cases.

In some embodiments, the gNB-CU 106 and the gNB-DU 108 may be part of a disaggregated gNB 105. The gNB-CU 106 and the gNB-DU 108 may be co-located, in some embodiments. The gNB-CU 106 and the gNB-DU 108 may not necessarily be co-located, in some embodiments.

The scope of embodiments is not limited to arrangements in which the gNB-CU 106 and the gNB-DU 108 are part of a disaggregated gNB 105, however. In some embodiments, one or more of the techniques, operations and/or methods described herein may be practiced by a gNB-CU 106 and/or gNB-DU 108 that may not necessarily be included in a disaggregated gNB 105. In some embodiments, one or more of the techniques, operations and/or methods described herein may be practiced by a gNB 105 that may not necessarily be a disaggregated gNB 105. In some embodiments, one or more of the techniques, operations and/or methods described herein may be practiced by a gNB 105 that may not necessarily include the gNB-CU 106 or gNB-DU 108.

References herein to communication between the gNB 105 and another component (such as the UE 102, MME 122, SGW 124 and/or other) are not limiting. In some embodiments, such communication may be performed between the component (such as the UE 102, MME 122, SGW 124 and/or other) and one or more of: the gNB-CU 106 and the gNB-DU 108. References herein to an operation, technique and/or method performed by the gNB 105 are not limiting. In some embodiments, such an operation, technique and/or method may be performed by the gNB-CU 106 and/or the gNB-DU 108.

In some embodiments, one or more of the UEs 102, gNBs 105, gNB-CU 106, gNB-DU 108 and/or eNBs 104 may be configured to operate in accordance with an NR protocol and/or NR techniques. References to a UE 102, eNB 104, gNB-CU 106, gNB-DU 108 and/or gNB 105 as part of descriptions herein are not limiting. For instance, descriptions of one or more operations, techniques and/or methods practiced by a gNB 105 are not limiting. In some embodiments, one or more of those operations, techniques and/or methods may be practiced by an eNB 104 and/or other base station component.

In some embodiments, the UE 102 may transmit signals (data, control and/or other) to the gNB 105, and may receive signals (data, control and/or other) from the gNB 105. In some embodiments, the UE 102 may transmit signals (data, control and/or other) to the eNB 104, and may receive signals (data, control and/or other) from the eNB 104. These embodiments will be described in more detail below. In some embodiments, the UE 102 may transmit signals to a component of a disaggregated gNB 105 (such as the gNB-DU 108 and/or other). In some embodiments, the UE 102 may receive signals from a component of a disaggregated gNB 105 (such as the gNB-DU 108 and/or other).

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 101, and routes data packets between the RAN 101 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

In some embodiments, the eNBs 104 (macro and micro) terminate the air interface protocol and may be the first point of contact for a UE 102. In some embodiments, an eNB 104 may fulfill various logical functions for the network 100, including but not limited to RNC (radio network controller functions) such as radio bearer management, uplink and downlink dynamic radio resource management and data packet scheduling, and mobility management.

In some embodiments, UEs 102 may be configured to communicate Orthogonal Frequency Division Multiplexing (OFDM) communication signals with an eNB 104 and/or gNB 105 over a multicarrier communication channel in accordance with an Orthogonal Frequency Division Multiple Access (OFDMA) communication technique. In some embodiments, eNBs 104 and/or gNBs 105 may be configured to communicate OFDM communication signals with a UE 102 over a multicarrier communication channel in accordance with an OFDMA communication technique. The OFDM signals may comprise a plurality of orthogonal subcarriers.

The S1 interface 115 is the interface that separates the RAN 101 and the EPC 120. It may be split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

In some embodiments, similar functionality and/or connectivity described for the eNB 104 may be used for the gNB 105, although the scope of embodiments is not limited in this respect. In a non-limiting example, the S1 interface 115 (and/or similar interface) may be split into two parts: the S1-U, which carries traffic data between the gNBs 105 and the serving GW 124, and the S1-MME, which is a signaling interface between the gNBs 104 and the MME 122. The X2 interface (and/or similar interface) may enable communication between eNBs 104, communication between gNBs 105 and/or communication between an eNB 104 and a gNB 105.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell. In some embodiments, various types of gNBs 105 may be used, including but not limited to one or more of the eNB types described above.

In some embodiments, the network 150 may include one or more components configured to operate in accordance with one or more 3GPP standards, including but not limited to an NR standard. The network 150 shown in FIG. 1B may include a next generation RAN (NG-RAN) 155, which may include one or more gNBs 105. In some embodiments, the network 150 may include the E-UTRAN 160, which may include one or more eNBs. The E-UTRAN 160 may be similar to the RAN 101 described herein, although the scope of embodiments is not limited in this respect.

In some embodiments, the network 150 may include the MME 165. The MME 165 may be similar to the MME 122 described herein, although the scope of embodiments is not limited in this respect. The MME 165 may perform one or more operations or functionality similar to those described herein regarding the MME 122, although the scope of embodiments is not limited in this respect.

In some embodiments, the network 150 may include the SGW 170. The SGW 170 may be similar to the SGW 124 described herein, although the scope of embodiments is not limited in this respect. The SGW 170 may perform one or more operations or functionality similar to those described herein regarding the SGW 124, although the scope of embodiments is not limited in this respect.

In some embodiments, the network 150 may include component(s) and/or module(s) for functionality for a user plane function (UPF) and user plane functionality for PGW (PGW-U), as indicated by 175. In some embodiments, the network 150 may include component(s) and/or module(s) for functionality for a session management function (SMF) and control plane functionality for PGW (PGW-C), as indicated by 180. In some embodiments, the component(s) and/or module(s) indicated by 175 and/or 180 may be similar to the PGW 126 described herein, although the scope of embodiments is not limited in this respect. The component(s) and/or module(s) indicated by 175 and/or 180 may perform one or more operations or functionality similar to those described herein regarding the PGW 126, although the scope of embodiments is not limited in this respect. One or both of the components 170, 172 may perform at least a portion of the functionality described herein for the PGW 126, although the scope of embodiments is not limited in this respect.

Embodiments are not limited to the number or type of components shown in FIG. 1B. Embodiments are also not limited to the connectivity of components shown in FIG. 1B.

In some embodiments, a downlink resource grid may be used for downlink transmissions from an eNB 104 to a UE 102, while uplink transmission from the UE 102 to the eNB 104 may utilize similar techniques. In some embodiments, a downlink resource grid may be used for downlink transmissions from a gNB 105 to a UE 102, while uplink transmission from the UE 102 to the gNB 105 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). There are several different physical downlink channels that are conveyed using such resource blocks. With particular relevance to this disclosure, two of these physical downlink channels are the physical downlink shared channel and the physical down link control channel.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
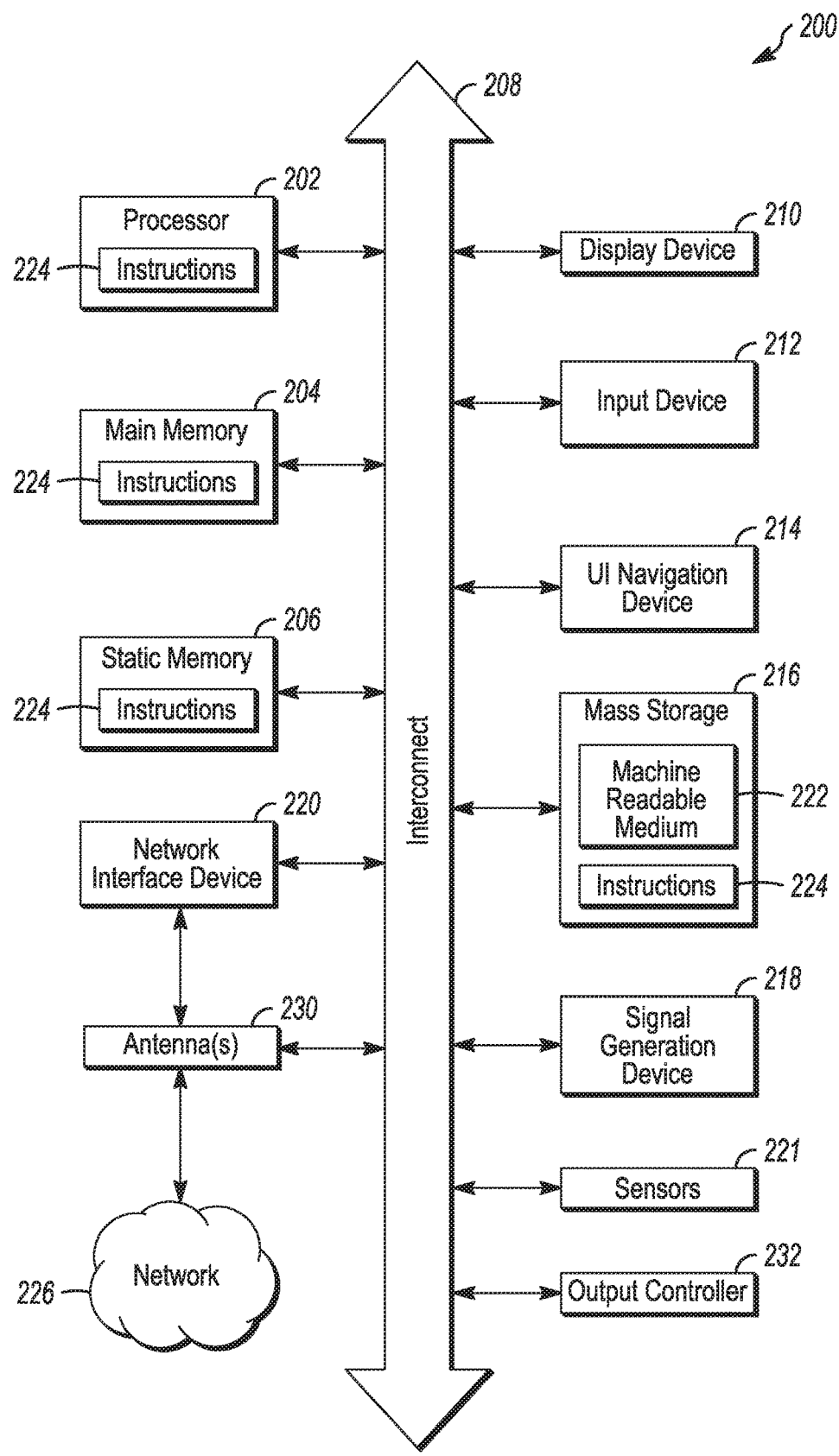
FIG. 2 illustrates a block diagram of an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be a UE 102, eNB 104, gNB 105, gNB-CU 106, gNB-DU 108, access point (AP), station (STA), user, device, mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In some embodiments, the machine readable medium may be or may include a computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
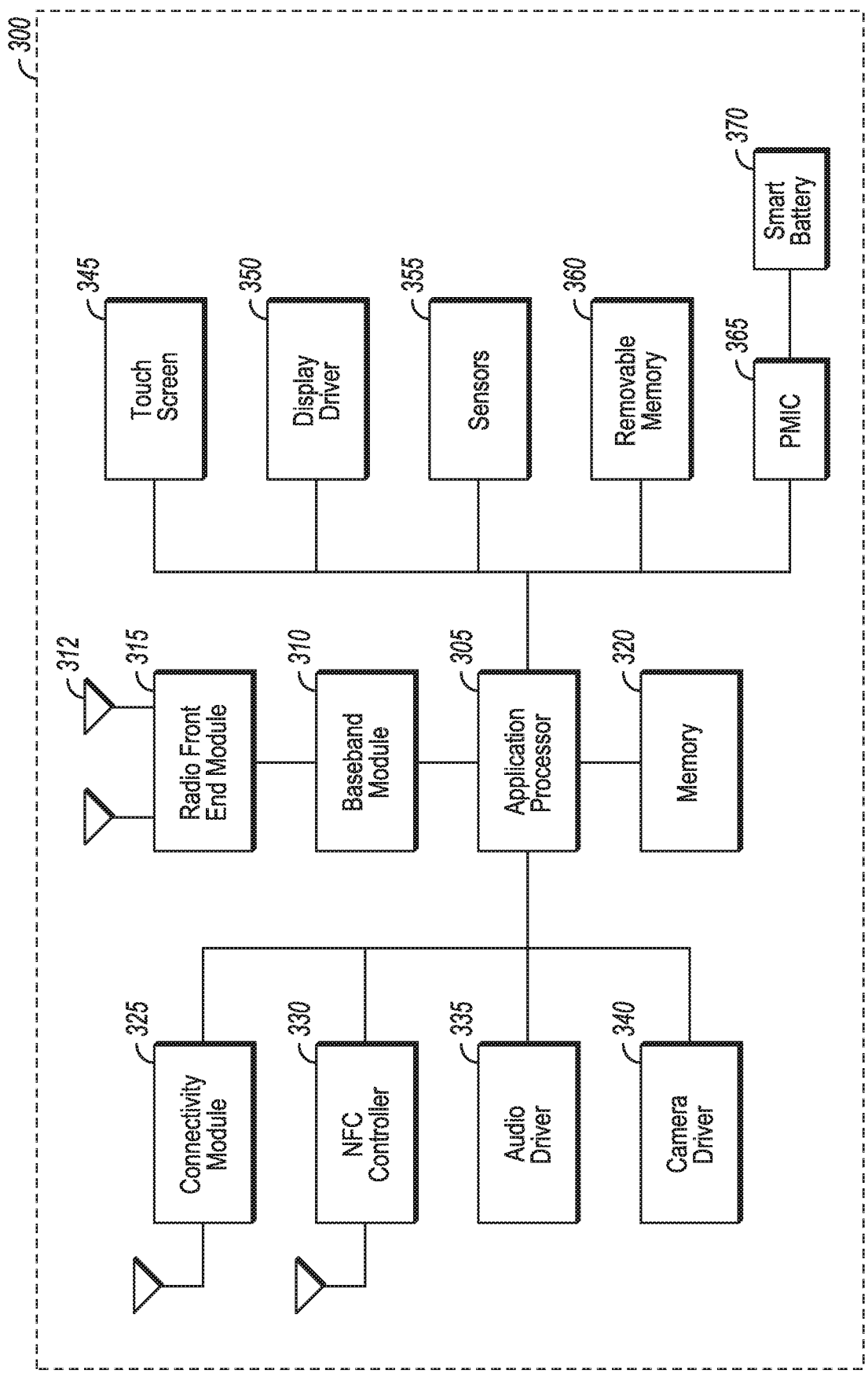
FIG. 3 illustrates a user device in accordance with some aspects.

FIG. 3 illustrates a user device in accordance with some aspects. In some embodiments, the user device 300 may be a mobile device. In some embodiments, the user device 300 may be or may be configured to operate as a User Equipment (UE). In some embodiments, the user device 300 may be arranged to operate in accordance with a new radio (NR) protocol. In some embodiments, the user device 300 may be arranged to operate in accordance with a Third Generation Partnership Protocol (3GPP) protocol. The user device 300 may be suitable for use as a UE 102 as depicted in FIG. 1, in some embodiments. It should be noted that in some embodiments, a UE, an apparatus of a UE, a user device or an apparatus of a user device may include one or more of the components shown in one or more of FIGS. 2, 3, and 5. In some embodiments, such a UE, user device and/or apparatus may include one or more additional components.

In some aspects, the user device 300 may include an application processor 305, baseband processor 310 (also referred to as a baseband module), radio front end module (RFEM) 315, memory 320, connectivity module 325, near field communication (NFC) controller 330, audio driver 335, camera driver 340, touch screen 345, display driver 350, sensors 355, removable memory 360, power management integrated circuit (PMIC) 365 and smart battery 370. In some aspects, the user device 300 may be a User Equipment (UE).

In some aspects, application processor 305 may include, for example, one or more CPU cores and one or more of cache memory, low drop-out voltage regulators (LDOs), interrupt controllers, serial interfaces such as serial peripheral interface (SPI), inter-integrated circuit (I²C) or universal programmable serial interface module, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband module 310 may be implemented, for example, as a solder-down substrate including one or more integrated circuits, a single packaged integrated circuit soldered to a main circuit board, and/or a multi-chip module containing two or more integrated circuits.

Figure 4:
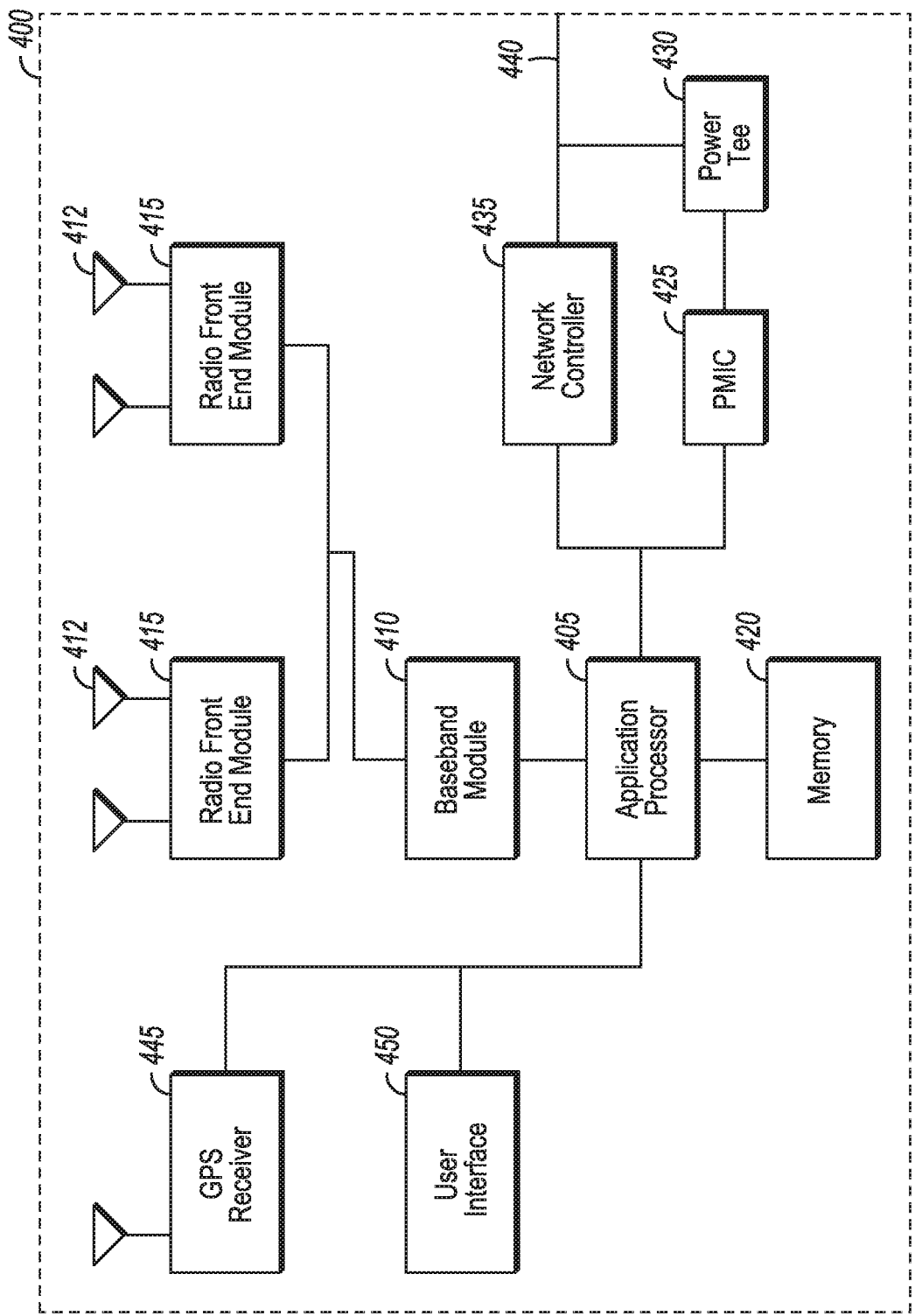
FIG. 4 illustrates a base station in accordance with some aspects.

FIG. 4 illustrates a base station in accordance with some aspects. In some embodiments, the base station 400 may be or may be configured to operate as an Evolved Node-B (eNB). In some embodiments, the base station 400 may be or may be configured to operate as a Next Generation Node-B (gNB). In some embodiments, the base station 400 may be arranged to operate in accordance with a new radio (NR) protocol. In some embodiments, the base station 400 may be arranged to operate in accordance with a Third Generation Partnership Protocol (3GPP) protocol. It should be noted that in some embodiments, the base station 400 may be a stationary non-mobile device. The base station 400 may be suitable for use as an eNB 104 as depicted in FIG. 1, in some embodiments. The base station 400 may be suitable for use as a gNB 105 as depicted in FIG. 1, in some embodiments. It should be noted that in some embodiments, an eNB, an apparatus of an eNB, a gNB, an apparatus of a gNB, a gNB-CU 106, an apparatus of a gNB-CU 106, a gNB-DU 108, an apparatus of a gNB-DU 108, a base station and/or an apparatus of a base station may include one or more of the components shown in one or more of FIGS. 2, 4, and 5. In some embodiments, such an eNB, gNB, gNB-CU, a gNB-DU, base station and/or apparatus may include one or more additional components.

FIG. 4 illustrates a base station or infrastructure equipment radio head 400 in accordance with some aspects. The base station 400 may include one or more of application processor 405, baseband modules 410, one or more radio front end modules 415, memory 420, power management circuitry 425, power tee circuitry 430, network controller 435, network interface connector 440, satellite navigation receiver module 445, and user interface 450. In some aspects, the base station 400 may be an Evolved Node-B (eNB), which may be arranged to operate in accordance with a 3GPP protocol, new radio (NR) protocol and/or Fifth Generation (5G) protocol. In some aspects, the base station 400 may be a Next Generation Node-B (gNB), which may be arranged to operate in accordance with a 3GPP protocol, new radio (NR) protocol and/or Fifth Generation (5G) protocol.

In some aspects, application processor 405 may include one or more CPU cores and one or more of cache memory, low drop-out voltage regulators (LDOs), interrupt controllers, serial interfaces such as SPI, I²C or universal programmable serial interface module, real time clock (RTC), timer-counters including interval and watchdog timers, general purpose IO, memory card controllers such as SD/MMC or similar, USB interfaces, MIPI interfaces and Joint Test Access Group (JTAG) test access ports.

In some aspects, baseband processor 410 may be implemented, for example, as a solder-down substrate including one or more integrated circuits, a single packaged integrated circuit soldered to a main circuit board or a multi-chip module containing two or more integrated circuits.

In some aspects, memory 420 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magneto-resistive random access memory (MRAM) and/or a three-dimensional cross-point memory. Memory 420 may be implemented as one or more of solder down packaged integrated circuits, socketed memory modules and plug-in memory cards.

In some aspects, power management integrated circuitry 425 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 430 may provide for electrical power drawn from a network cable to provide both power supply and data connectivity to the base station 400 using a single cable. In some aspects, network controller 435 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver module 445 may include circuitry to receive and decode signals transmitted by one or more navigation satellite constellations such as the global positioning system (GPS), Globalnaya Navigatsionnaya Sputnikovaya Sistema (GLONASS). Galileo and/or BeiDou. The receiver 445 may provide data to application processor 405 which may include one or more of position data or time data. Application processor 405 may use time data to synchronize operations with other radio base stations. In some aspects, user interface 450 may include one or more of physical or virtual buttons, such as a reset button, one or more indicators such as light emitting diodes (LEDs) and a display screen.

Figure 5:
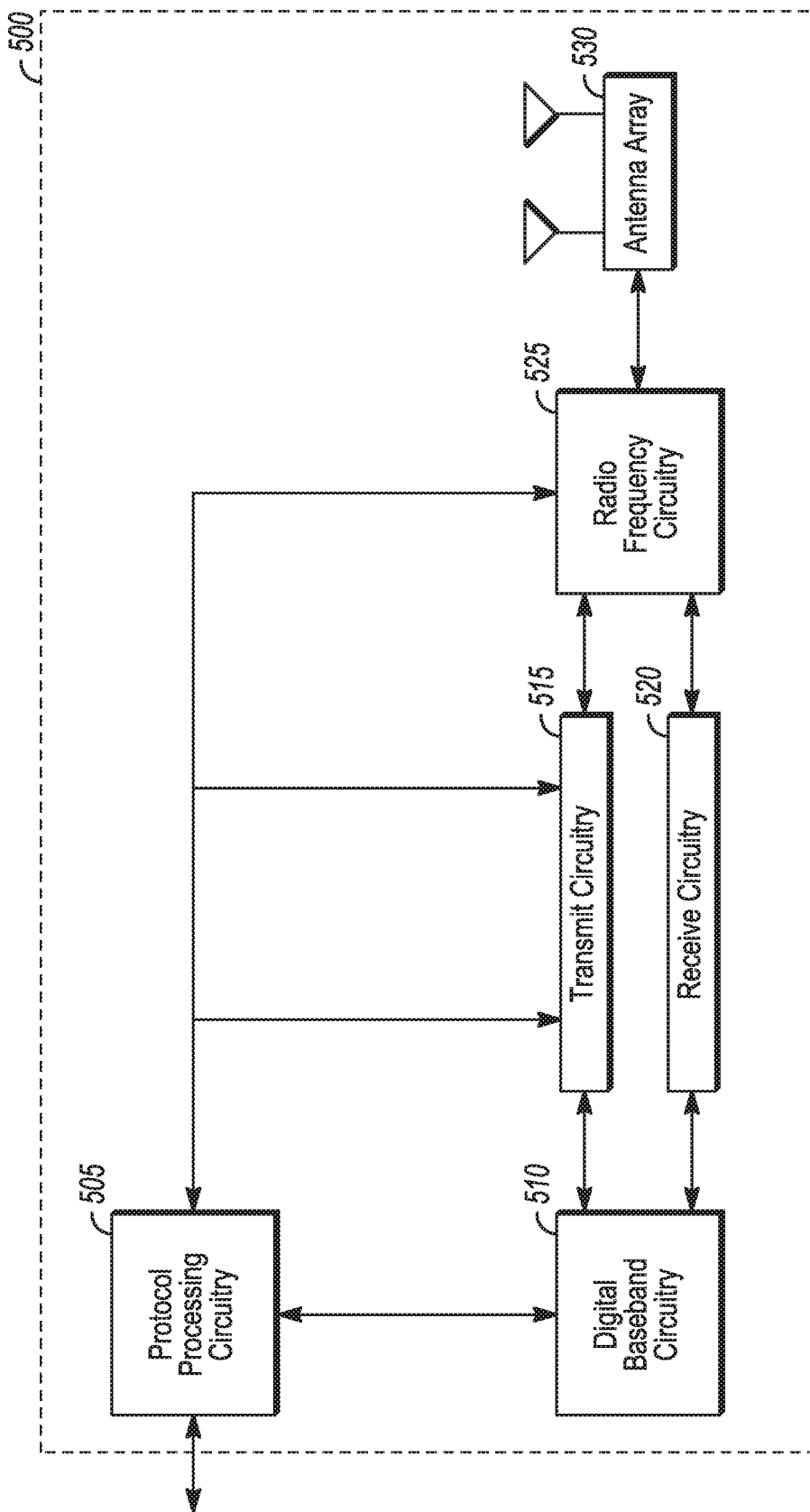
FIG. 5 illustrates an exemplary communication circuitry according to some aspects.

FIG. 5 illustrates an exemplary communication circuitry according to some aspects. Circuitry 500 is alternatively grouped according to functions. Components as shown in 500 are shown here for illustrative purposes and may include other components not shown here in FIG. 5. In some aspects, the communication circuitry 500 may be used for millimeter wave communication, although aspects are not limited to millimeter wave communication. Communication at any suitable frequency may be performed by the communication circuitry 500 in some aspects.

It should be noted that a device, such as a UE 102, eNB 104, gNB 105, gNB-CU 106, gNB-DU 108, the user device 300, the base station 400, the machine 200 and/or other device may include one or more components of the communication circuitry 500, in some aspects.

The communication circuitry 500 may include protocol processing circuitry 505, which may implement one or more of medium access control (MAC), radio link control (RLC), packet data convergence protocol (PDCP), radio resource control (RRC) and non-access stratum (NAS) functions. Protocol processing circuitry 505 may include one or more processing cores (not shown) to execute instructions and one or more memory structures (not shown) to store program and data information.

The communication circuitry 500 may further include digital baseband circuitry 510, which may implement physical layer (PHY) functions including one or more of hybrid automatic repeat request (HARQ) functions, scrambling and/or descrambling, coding and/or decoding, layer mapping and/or demapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

The communication circuitry 500 may further include transmit circuitry 515, receive circuitry 520 and/or antenna array circuitry 530. The communication circuitry 500 may further include radio frequency (RF) circuitry 525. In an aspect of the disclosure, RF circuitry 525 may include multiple parallel RF chains for one or more of transmit or receive functions, each connected to one or more antennas of the antenna array 530.

In an aspect of the disclosure, protocol processing circuitry 505 may include one or more instances of control circuitry (not shown) to provide control functions for one or more of digital baseband circuitry 510, transmit circuitry 515, receive circuitry 520, and/or radio frequency circuitry 525.

In some embodiments, processing circuitry may perform one or more operations described herein and/or other operation(s). In a non-limiting example, the processing circuitry may include one or more components such as the processor 202, application processor 305, baseband module 310, application processor 405, baseband module 410, protocol processing circuitry 505, digital baseband circuitry 510, similar component(s) and/or other component(s).

In some embodiments, a transceiver may transmit one or more elements (including but not limited to those described herein) and/or receive one or more elements (including but not limited to those described herein). In a non-limiting example, the transceiver may include one or more components such as the radio front end module 315, radio front end module 415, transmit circuitry 515, receive circuitry 520, radio frequency circuitry 525, similar component(s) and/or other component(s).

One or more antennas (such as 230, 312, 412, 530 and/or others) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, one or more of the antennas (such as 230, 312, 412, 530 and/or others) may be effectively separated to take advantage of spatial diversity and the different channel characteristics that may result.

In some embodiments, the UE 102, eNB 104, gNB 105, gNB-CU 106, gNB-DU 108, user device 300, base station 400, machine 200 and/or other device described herein may be a mobile device and/or portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 102, eNB 104, gNB 105, gNB-CU 106, gNB-DU 108, user device 300, base station 400, machine 200 and/or other device described herein may be configured to operate in accordance with 3GPP standards, although the scope of the embodiments is not limited in this respect. In some embodiments, the UE 102, eNB 104, gNB 105, gNB-CU 106, gNB-DU 108, user device 300, base station 400, machine 200 and/or other device described herein may be configured to operate in accordance with new radio (NR) standards, although the scope of the embodiments is not limited in this respect. In some embodiments, the UE 102, eNB 104, gNB 105, gNB-CU 106, gNB-DU 108, user device 300, base station 400, machine 200 and/or other device described herein may be configured to operate according to other protocols or standards, including IEEE 802.11 or other IEEE standards. In some embodiments, the UE 102, eNB 104, gNB 105, gNB-CU 106, gNB-DU 108, user device 300, base station 400, machine 200 and/or other device described herein may include one or more of a keyboard, a display, a non-volatile memory port, multiple antennas, a graphics processor, an application processor, speakers, and other mobile device elements. The display may be an LCD screen including a touch screen.

Although the UE 102, eNB 104, gNB 105, gNB-CU 106, gNB-DU 108, user device 300, base station 400, machine 200 and/or other device described herein may each be illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus of the UE 102, eNB 104, gNB 105, gNB-CU 106, gNB-DU 108, machine 200, user device 300 and/or base station 400 may include various components shown in FIGS. 2-5. Accordingly, techniques and operations described herein that refer to the UE 102 may be applicable to an apparatus of a UE. In addition, techniques and operations described herein that refer to the eNB 104 may be applicable to an apparatus of an eNB. In addition, techniques and operations described herein that refer to the gNB 105 may be applicable to an apparatus of a gNB. In addition, techniques and operations described herein that refer to the gNB-CU 106, may be applicable to an apparatus of a gNB-CU. In addition, techniques and operations described herein that refer to the gNB-DU 108 may be applicable to an apparatus of a gNB-DU.

It should be noted that some of the descriptions herein may refer to performance of operations, methods and/or techniques by components such as the gNB 105, the gNB-CU 106, and the gNB-DU 108. Such references are not limiting, however. For instance, descriptions herein may refer to performance of an operation by one of those components. In some embodiments, one of the other components may perform the same operation, a similar operation, a related operation and/or a reciprocal operation. In a non-limiting example, the gNB-CU 106 may perform an operation (such as transmission of a packet), and the gNB-DU 108 may perform a reciprocal operation (such as reception of the packet). In a non-limiting example, the gNB-DU 108 may perform an operation (such as transmission of a packet), and the UE 102 may perform a reciprocal operation (such as reception of the packet).

In accordance with some embodiments, a generation node B (gNB) 105 may be configured with logical nodes including a gNB central unit (gNB-CU) 106 and a gNB distributed unit (gNB-DU) 108. The gNB-CU 106 may be configured to communicate with the gNB-DU 108 over an F1 interface. The gNB 105 may determine, by the gNB-CU 106, a first precoding matrix and a second precoding matrix for a precoding of one or more data streams for transmission on a plurality of antennas coupled to the gNB-DU 108. The precoding may be in accordance with a split functionality between the gNB-CU 106 and the gNB-DU 108 that includes: precoding by the gNB-CU 106 with the first precoding matrix, and precoding by the gNB-DU 108 with the second precoding matrix. The gNB-CU 106 may be configured to precode first symbols from the data streams by the first precoding matrix to generate second symbols for transfer on the F1 interface to the gNB-DU 108. The gNB-DU 108 may be configured to precode the second symbols by the second precoding matrix to generate third symbols for transmission on the antennas. These embodiments are described in more detail below.

Figure 6:
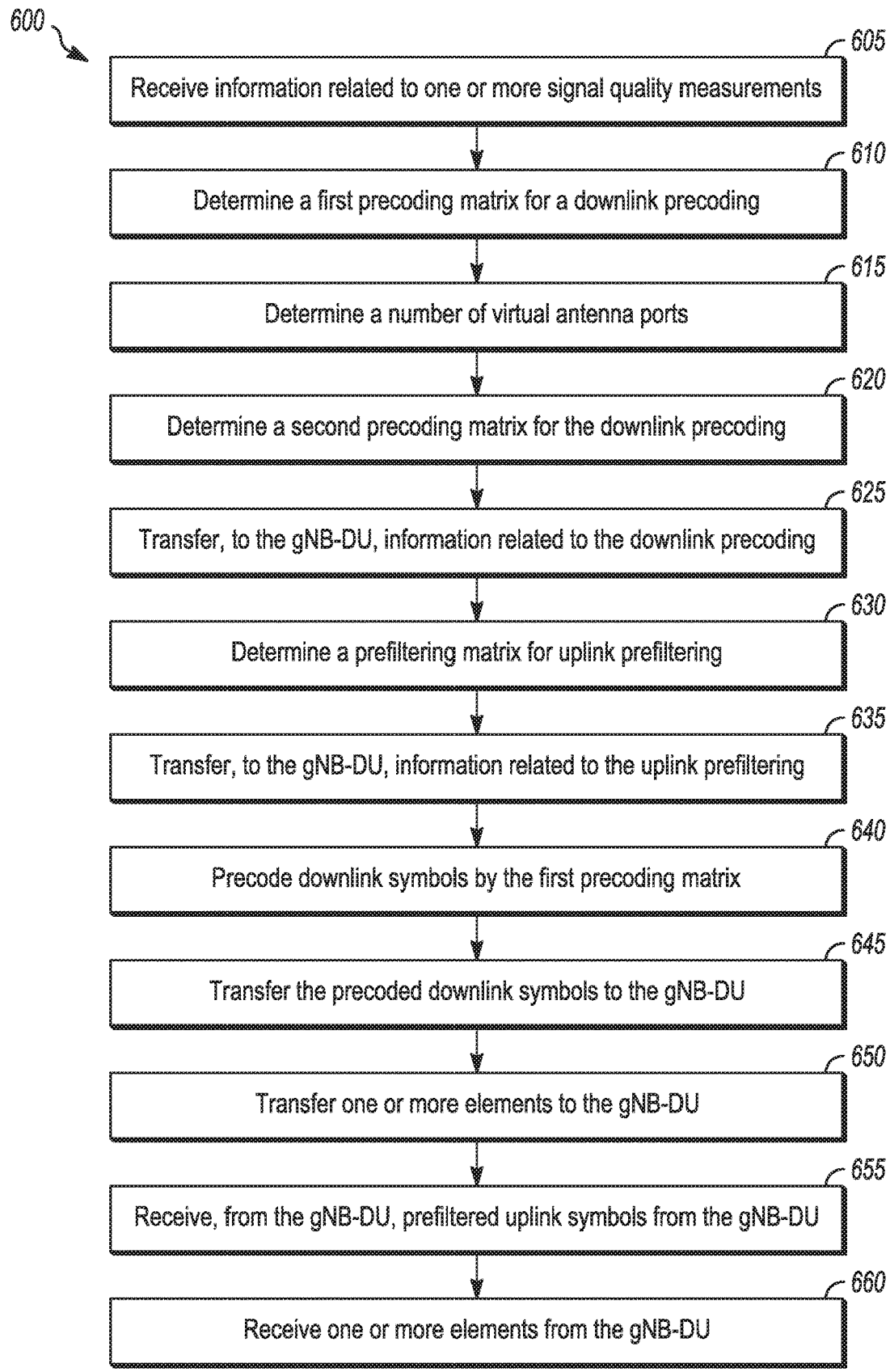
FIG. 6 illustrates the operation of a method of communication in accordance with some embodiments.
Figure 7:
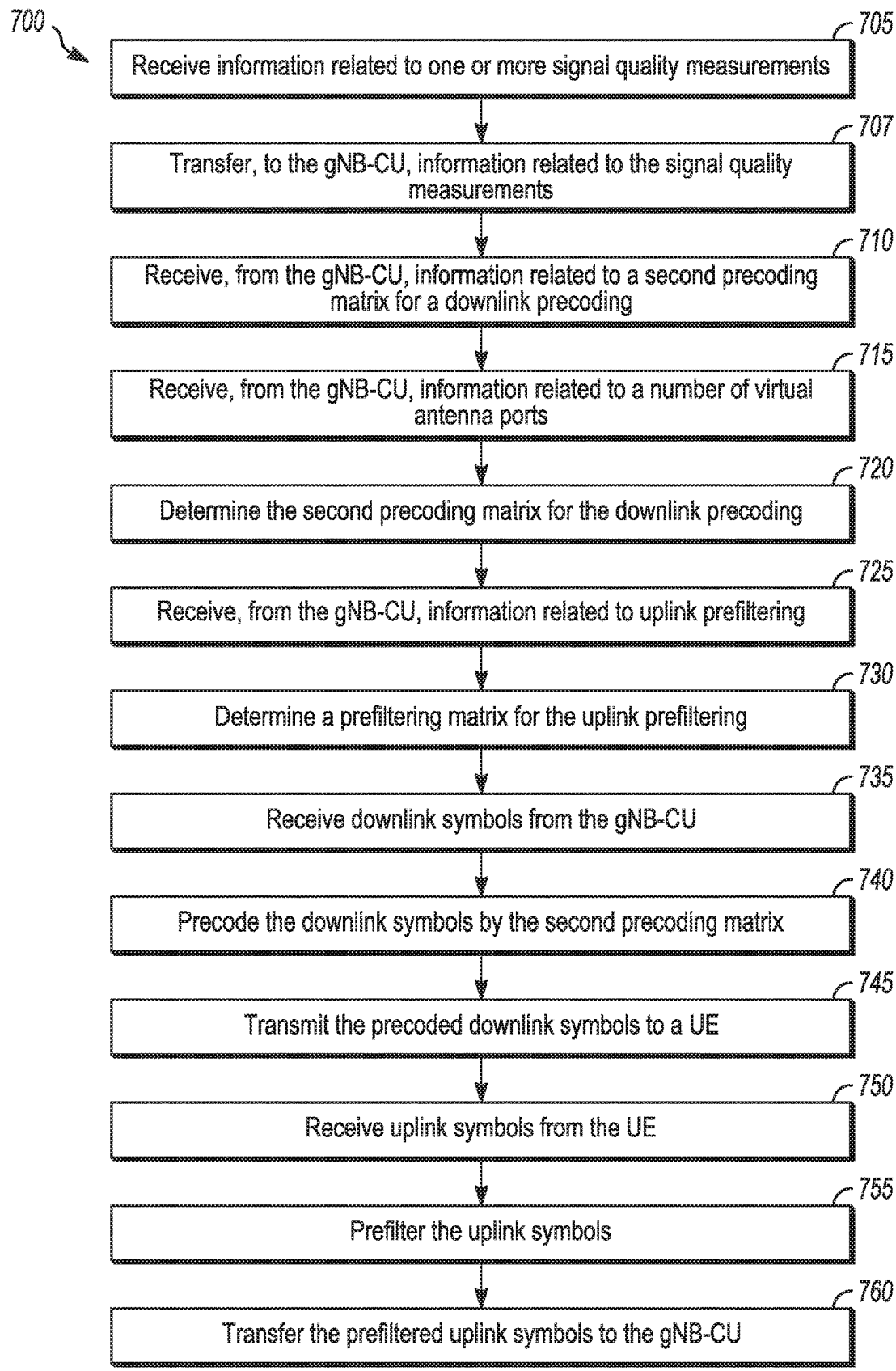
FIG. 7 illustrates the operation of another method of communication in accordance with some embodiments.
Figure 8:
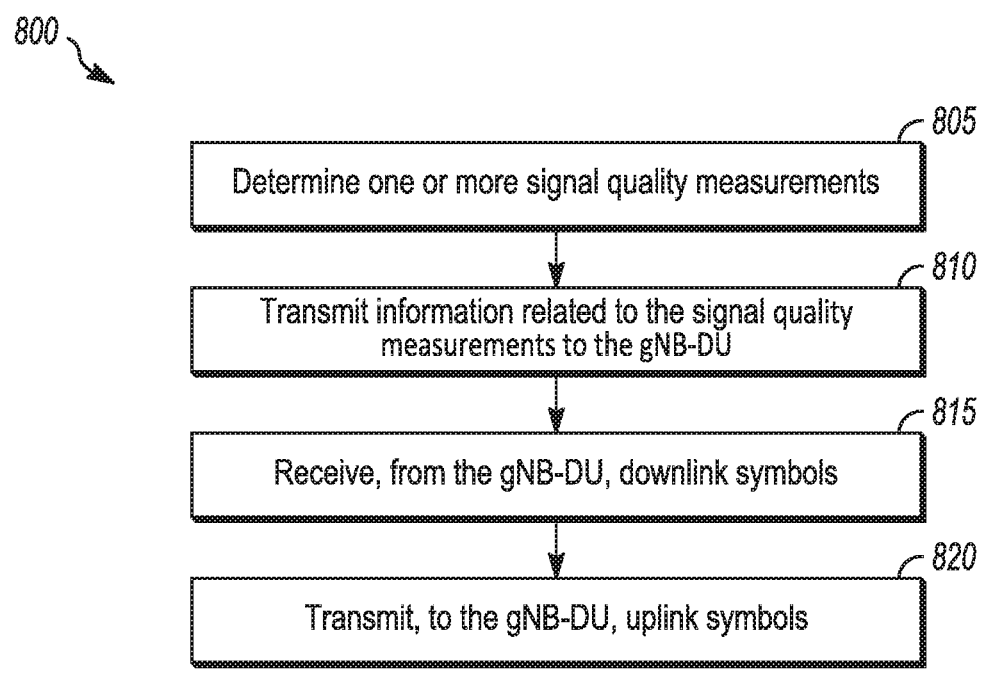
FIG. 8 illustrates the operation of another method of communication in accordance with some embodiments.

FIG. 6 illustrates the operation of a method of communication in accordance with some embodiments. FIG. 7 illustrates the operation of another method of communication in accordance with some embodiments. FIG. 8 illustrates the operation of another method of communication in accordance with some embodiments. It is important to note that embodiments of the methods 600, 700, 800 may include additional or even fewer operations or processes in comparison to what is illustrated in FIGS. 6-8. In addition, embodiments of the methods 600, 700, 800 are not necessarily limited to the chronological order that is shown in FIGS. 6-8. In describing the methods 600, 700, 800, reference may be made to one or more figures, although it is understood that the methods 600, 700, 800 may be practiced with any other suitable systems, interfaces and components.

In some embodiments, a gNB-CU 106 may perform one or more operations of the method 600, but embodiments are not limited to performance of the method 600 and/or operations of it by the gNB-CU 106. In some embodiments, another device and/or component may perform one or more operations of the method 600. In some embodiments, another device and/or component may perform one or more operations that may be similar to one or more operations of the method 600. In some embodiments, another device and/or component may perform one or more operations that may be reciprocal to one or more operations of the method 600. In a non-limiting example, the gNB 105 may perform an operation that may be the same as, similar to, reciprocal to and/or related to an operation of the method 600, in some embodiments.

In some embodiments, a gNB-DU 108 may perform one or more operations of the method 700, but embodiments are not limited to performance of the method 700 and/or operations of it by the gNB-DU 108. In some embodiments, another device and/or component may perform one or more operations of the method 700. In some embodiments, another device and/or component may perform one or more operations that may be similar to one or more operations of the method 700. In some embodiments, another device and/or component may perform one or more operations that may be reciprocal to one or more operations of the method 700. In a non-limiting example, the gNB 105 may perform an operation that may be the same as, similar to, reciprocal to and/or related to an operation of the method 700, in some embodiments.

In some embodiments, a UE 102 may perform one or more operations of the method 800, but embodiments are not limited to performance of the method 800 and/or operations of it by the UE 102. In some embodiments, another device and/or component may perform one or more operations of the method 800. In some embodiments, another device and/or component may perform one or more operations that may be similar to one or more operations of the method 800. In some embodiments, another device and/or component may perform one or more operations that may be reciprocal to one or more operations of the method 800.

It should be noted that one or more operations of one of the methods 600, 700, 800 may be the same as, similar to and/or reciprocal to one or more operations of the other methods. For instance, an operation of the method 600 may be the same as, similar to and/or reciprocal to an operation of the method 700, in some embodiments. In a non-limiting example, an operation of the method 600 may include transmission of an element (such as a frame, block, message and/or other) by the gNB-CU 106, and an operation of the method 700 may include reception of a same element (and/or similar element) by the gNB-DU 108 from the gNB-CU 106. In some cases, descriptions of operations and techniques described as part of one of the methods 600, 700, 800 may be relevant to one or both of the other methods.

Discussion of various techniques and concepts regarding one of the methods 600, 700, 800 and/or other method may be applicable to one of the other methods, although the scope of embodiments is not limited in this respect. Such technique and concepts may include precoding, precoding matrixes, precoding matrix packet, prefiltering, prefiltering matrixes, prefiltering matrix packet, transfer on the F1 interface and/or other.

The methods 600, 700, 800 and other methods described herein may refer to eNBs 104, gNBs 105, gNB-CUs 106, gNB-DUs 108 and/or UEs 102 operating in accordance with 3GPP standards, 5G standards. NR standards and/or other standards. However, embodiments are not limited to performance of those methods by those components, and may also be performed by other devices, such as a Wi-Fi access point (AP) or user station (STA). In addition, the methods 600, 700, 800 and other methods described herein may be practiced by wireless devices configured to operate in other suitable types of wireless communication systems, including systems configured to operate according to various IEEE standards such as IEEE 802.11. The methods 600, 700, 800 may also be applicable to an apparatus of a UE 102, an apparatus of an eNB 104, an apparatus of a gNB 105, an apparatus of a gNB-CU 106, an apparatus of a gNB-DU 108 and/or an apparatus of another device described above.

It should also be noted that embodiments are not limited by references herein (such as in descriptions of the methods 600, 700 and 800 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

One or more of the elements (such as messages, operations and/or other) described herein may be included in a standard and/or protocol, including but not limited to Third Generation Partnership Project (3GPP), 3GPP Long Term Evolution (LTE), Fourth Generation (4G), Fifth Generation (5G), New Radio (NR) and/or other. The scope of embodiments is not limited to usage of elements that are included in standards, however.

In some embodiments, the gNB 105 may be configured with logical nodes including a gNB central unit (gNB-CU) 106 and a gNB distributed unit (gNB-DU) 108, and the gNB-CU 106 and the gNB-DU 108 may be configured to communicate with each other over an F1 interface. The scope of embodiments is not limited in this respect, however, as another device (such as a gNB 105 that does not necessarily include the gNB-CU 106 and gNB-DU 108) may perform one or more operations of the method 600 and/or other operations described herein.

At operation 605, the gNB-CU 106 may receive information related to one or more signal quality measurements. In some embodiments, the information related to the signal quality measurements may be received from the gNB-DU 108, although the scope of embodiments is not limited in this respect. In some embodiments, the signal quality measurements may be determined at the UE 102. In some embodiments, the UE 102 may transmit information related to the signal quality measurements to the gNB-DU 108, and the gNB-DU 108 may transfer information (the information received from the UE 102, a portion of the information received from the UE 102, information based on the information received from the UE 102 and/or other) to the gNB-CU 106.

Example signal quality measurements (for operation 605 and/or other operations described herein) include, but are not limited to, received signal power, average received signal power, signal-to-noise ratio (SNR), reference signal received power (RSRP), reference signal received quality (RSRQ), and received signal strength indicator (RSSI).

At operation 610, the gNB-CU 106 may determine a number of virtual antenna ports. At operation 615, the gNB-CU 106 may determine a first precoding matrix for downlink precoding. At operation 620, the gNB-CU 106 may determine a second precoding matrix for the downlink precoding.

In some embodiments, the gNB-CU 106 may determine the first precoding matrix and the second precoding matrix for a precoding of one or more data streams for transmission on a plurality of antennas coupled to the gNB-DU 108. In some embodiments, the precoding may be in accordance with a split functionality between the gNB-CU 106 and the gNB-DU 108 that includes: precoding by the gNB-CU 106 with the first precoding matrix, and precoding by the gNB-DU 108 with the second precoding matrix.

In some embodiments, a number of rows of the first precoding matrix may be equal to a number of virtual ports, a number of columns of the first precoding matrix may be equal to a number of the data streams, a number of rows of the second precoding matrix may be equal to a number of the antennas coupled to the gNB-DU, and a number of columns of the second precoding matrix may be equal to the number of virtual ports.

In some embodiments, the gNB-CU 106 may determine the number of virtual ports as a number that is less than the number of antennas coupled to the gNB-DU 106. In some embodiments, the gNB-CU 106 may determine the number of virtual ports as described above to cause a size of symbols transferred on the F1 interface from the gNB-CU 106 to the gNB-DU 108 (or from the gNB-DU 108 to the gNB-CU 106) to be less than symbols generated, by the gNB-DU 108, for transmission on the antennas.

In some embodiments, the gNB-CU 106 may determine the first precoding matrix and/or the second precoding matrix based at least partly on the one or more signal quality measurements. In some embodiments, the gNB-CU 16 may perform one or more of: select the first precoding matrix from first candidate precoding matrixes: and select the second precoding matrix from second candidate precoding matrixes.

At operation 625, the gNB-CU 106 may transfer, to the gNB-DU 108, information related to the downlink precoding. In some embodiments, the gNB-CU 106 may transfer a precoding matrix packet to the gNB-DU 108. The precoding matrix packet may include one or more of: a number of virtual antenna ports; information related to the second precoding matrix (such as coefficients, size of the matrix and/or other): information related to the first precoding matrix; and/or other information. In some embodiments, the gNB-CU 106 may encode the precoding matrix packet for transfer to the gNB-DU 108 on the F1 interface, and the precoding matrix packet may indicate the second precoding matrix and/or information related to the precoding.

Embodiments are not limited to usage of the precoding matrix packet in this operation and/or other operations, as other elements may be used, in some embodiments. The precoding matrix packet may be included in a 3GPP protocol, 5G protocol and/or NR protocol, in some embodiments. Embodiments are not limited to usage of elements from those protocols.

At operation 630, the gNB-CU 106 may determine a prefiltering matrix for uplink prefiltering. In some embodiments, the prefiltering matrix may be for conversion of first uplink symbols received by the gNB-DU 108 from a UE 102 at the gNB-DU 108 to second uplink symbols for transfer to the gNB-CU 106 on the F1 interface, although the scope of embodiments is not limited in this respect. In some embodiments, the gNB-DU 108 may determine the prefiltering matrix. Accordingly, the gNB-CU 106 may not necessarily perform operation 630, in some embodiments.

In some embodiments, the gNB-CU 106 may determine the prefiltering matrix based at least partly on one or more signal quality measurements. In a non-limiting example, the signal quality measurements (and/or related information) may be received by the gNB-CU 106 from the gNB-DU 108. The signal quality measurements may be determined at the UE 102 and transmitted to the gNB-DU 108.

At operation 635, the gNB-CU 106 may transfer, to the gNB-DU 108, information related to the uplink prefiltering. In some embodiments, the gNB-CU 106 may transfer a prefiltering matrix packet to the gNB-DU 108. The prefiltering matrix packet may include one or more of: a number of virtual antenna ports; information related to the prefiltering matrix (such as coefficients, size of the matrix and/or other); and/or other information. Embodiments are not limited to usage of the prefiltering matrix packet in this operation and/or other operations, as other elements may be used, in some embodiments. The prefiltering matrix packet may be included in a 3GPP protocol, 5G protocol and/or NR protocol, in some embodiments. Embodiments are not limited to usage of elements from those protocols.

At operation 640, the gNB-CU 106 may precode downlink symbols by the first precoding matrix. At operation 645, the gNB-CU 106 may transfer the precoded downlink symbols to the gNB-DU 108. At operation 650, the gNB-CU 106 may transfer one or more elements to the gNB-DU 108.

In some embodiments, the gNB-CU 106 may precode first symbols from the data streams by the first precoding matrix to generate second symbols for transfer on the F1 interface to the gNB-DU 108. The gNB-DU 108 may precode the second symbols by the second precoding matrix to generate third symbols for transmission on the antennas. In some embodiments, the gNB-CU 106 may determine the number of virtual ports as a number that is less than the number of antennas coupled to the gNB-DU 108 to cause a size of the second symbols to be less than a size of the third symbols.

In some embodiments, the gNB-DU 108 may determine the second precoding matrix to convert the second data symbols into third data symbols of size based on a number of antennas coupled to the gNB-DU 108. A number of rows of the second precoding matrix may be equal to the number of antennas coupled to the gNB-DU 106, and a number of columns of the second precoding matrix may be equal to the number of virtual antenna ports.

In some embodiments, the first symbols may include a first vector of length equal to the number of data streams at the gNB-CU 106. The second symbols may include a second vector of length equal to the number of virtual ports. The second vector may be based on a product of the first precoding matrix and the first vector. The third symbols may include a third vector of length equal to the number of antennas coupled. The third vector may be based on a product of the second precoding matrix and the second vector.

In some embodiments, the first vector, the second vector, and the third vector include symbols for transmission on a resource element (RE) of a plurality of REs during a symbol period of a plurality of symbol periods.

In some embodiments, if the first symbols are included in a physical downlink shared channel (PDSCH), a physical downlink control channel (PDCCH) or demodulation reference signals (DMRSs), the gNB-CU 106 may precode the first symbols by the first precoding matrix for transfer on the F1 interface to the gNB-DU 108. In some embodiments, if the first symbols are included in channel state information reference signals (CSI-RS), a primary synchronization signal (PSS), a secondary synchronization signal or a physical broadcast channel (PBCH), the gNB-CU 106 may: precode the first symbols by the first preceding matrix for transfer on the F1 interface to the gNB-DU 108; or transfer the first symbols without preceding on the F1 interface to the gNB-DU 108. In some embodiments, the gNB-CU 106 may generate the first symbols based on a Fourier Transform (FT) operation on the one or more data streams.

At operation 655, the gNB-CU 106 may receive, from the gNB-DU 108, prefiltered uplink symbols from the gNB-DU 108. The gNB-CU 106 may decode one or more uplink packets based on uplink symbols (including but not limited to prefiltered uplink symbols) received from the gNB-DU 108.

At operation 660, the gNB-CU 106 may receive one or more elements from the gNB-DU 108. The elements may or may not be prefiltered. The elements may be related to one or more of: a sounding reference signal (SRS), a random access channel (RACH) and/or other.

In some embodiments, an apparatus of a gNB 105 and/or gNB-CU 106 may comprise memory. The memory may be configurable to store the first and second precoding matrixes. The memory may store one or more other elements and the apparatus may use them for performance of one or more operations. The apparatus may include processing circuitry, which may perform one or more operations (including but not limited to operation(s) of the method 600 and/or other methods described herein). The processing circuitry may include a baseband processor. The baseband circuitry and/or the processing circuitry may perform one or more operations described herein, including but not limited to determination of the first and second precoding matrixes. The apparatus may include an interface to transfer the precoding matrix packet. The interface may transfer and/or receive other blocks, messages and/or other elements.

In some embodiments, the antennas may be coupled to one or more of: the gNB-DU 108, an apparatus of the gNB-DU 108, the gNB 105, and an apparatus of the gNB 105. In some embodiments, one or more of the following may comprise the antennas: the gNB-DU 108, an apparatus of the gNB-DU 108, the gNB 105, and an apparatus of the gNB 105.

At operation 705, the gNB-DU 108 may receive information related to one or more signal quality measurements. At operation 707, the gNB-DU 108 may transfer, to the gNB-CU 106, information related to the signal quality measurements.

In some embodiments, the gNB-DU 108 may receive the information related to the signal quality measurements from the UE 102. In some embodiments, the gNB-DU 108 may transfer information (the information received from the UE 102, a portion of the information received from the UE 102, information based on the information received from the UE 102 and/or other) to the gNB-CU 106.

At operation 710, the gNB-DU 108 may receive, from the gNB-CU 106, information related to a second precoding matrix for a downlink precoding. At operation 715, the gNB-DU 108 may receive, from the gNB-CU 106, information related to a number of virtual antenna ports.

At operation 720, the gNB-DU 108 may determine the second precoding matrix for the downlink precoding. In some embodiments, the gNB-DU 108 may generate, for transmission to the UE 102, a plurality of precoded signals based on a plurality of candidate precoding matrixes. The gNB-DU 108 may receive, from the UE 102, one or more signal quality measurements based on the plurality of precoded signals. The gNB-DU 108 may determine the second precoding matrix based at least partly on the signal quality measurements.

In some embodiments, the gNB-DU 108 may determine the second precoding matrix. In some embodiments, the information related to the second precoding matrix (received from the gNB-CU 106 at operation 710) may indicate the second precoding matrix. Accordingly, the gNB-DU 108 may not necessarily perform operation 720, in some embodiments.

At operation 725, the gNB-DU 108 may receive, from the gNB-CU 106, information related to uplink prefiltering. In some embodiments, the information may include one or more of: a number of virtual antenna ports; information related to the prefiltering matrix (such as coefficients, size of the matrix and/or other); and/or other information. In some embodiments, the information may be included in a prefiltering matrix packet, although the scope of embodiments is not limited in this respect.

In some embodiments, the prefiltering matrix may be for conversion of first symbols received from a UE 102 on a plurality of antennas to second symbols for transfer to the gNB-CU 106 on the F1 interface. In some embodiments, a size of the first symbols may be based on a number of the antennas, and a size of the second symbols may be based on the number of virtual antenna ports. In some embodiments, a number of rows of the prefiltering matrix may be equal to the number of virtual antenna ports, and a number of columns of the prefiltering matrix may be equal to the number of antennas.

At operation 730, the gNB-DU 108 may determine a prefiltering matrix for the uplink prefiltering. In some embodiments, the gNB-DU 108 may determine the prefiltering matrix. For instance, the gNB-DU 108 may determine the prefiltering matrix based at least partly on information (such as the number of virtual antenna ports) received at operation 725. In some embodiments, the gNB-CU 106 may determine the prefiltering matrix and may transfer information that indicates the prefiltering matrix. Accordingly, the gNB-DU 108 may not necessarily perform operation 730, in some embodiments.

At operation 735, the gNB-DU 108 may receive downlink symbols from the gNB-CU 106. At operation 740, the gNB-DU 108 may precode the downlink symbols by the second precoding matrix. At operation 745, the gNB-DU 108 may transmit the precoded downlink symbols to a UE 102.

In some embodiments, the downlink symbols received from the gNB-CU 106 may be prefiltered by the gNB-CU 106 (such as by a first precoding matrix), although the scope of embodiments is not limited in this respect. Accordingly, the symbols transmitted to the UE 102 at operation 745 may be precoded by the first and second precoding matrixes, in some embodiments.

At operation 750, the gNB-DU 108 may receive uplink symbols from the UE 102. At operation 755, the gNB-DU 108 may prefilter the uplink symbols. At operation 760, the gNB-DU 108 may transfer the prefiltered uplink symbols to the gNB-CU 106.

In some embodiments, the gNB-DU 108 may prefilter first symbols from the antennas by the prefiltering matrix to generate second symbols for transfer on the F1 interface to the gNB-CU 106. The gNB-CU 106 may decode an uplink packet based on the second symbols. In some embodiments, the first symbols may include a first vector of length equal to the number of antennas, the second symbols may include a second vector of length equal to the number of virtual antenna ports, and the second vector may be based on a product of the prefiltering matrix and the first vector.

In some embodiments, the gNB-DU 108 may, if the first symbols are included in a physical uplink shared channel (PUSCH) or a physical uplink control channel (PUCCH): prefilter the first symbols by the prefiltering matrix for transfer on the F1 interface to the gNB-CU 106. In some embodiments, the gNB-DU 108 may, if the first symbols are included in a sounding reference signal (SRS) or a random access channel (RACH): prefilter the first symbols by the prefiltering matrix for transfer on the F1 interface to the gNB-CU 106; or transfer the first symbols without prefiltering on the F1 interface to the gNB-CU 106. In some embodiments, the gNB-DU 108 may generate the first symbols based on an inverse Fourier Transform (FT) operation on signals from the antennas.

In some embodiments, an apparatus of a gNB 105 and/or gNB-DU 108 may comprise memory. The memory may be configurable to store the prefiltering matrix. The memory may store one or more other elements and the apparatus may use them for performance of one or more operations. The apparatus may include processing circuitry, which may perform one or more operations (including but not limited to operation(s) of the method 700 and/or other methods described herein). The processing circuitry may include a baseband processor. The baseband circuitry and/or the processing circuitry may perform one or more operations described herein, including but not limited to determination of the prefiltering matrix. The apparatus may include a transceiver to receive uplink data symbols from the UE 102. The transceiver may transmit and/or receive other blocks, messages and/or other element.

At operation 805, the UE 102 may determine one or more signal quality measurements. At operation 810, the UE 102 may transmit information related to the signal quality measurements to the gNB-DU 108. At operation 815, the UE 102 may receive, from the gNB-DU 108, downlink symbols. At operation 820, the UE 102 may transmit, to the gNB-DU 108, uplink symbols.

In some embodiments, an apparatus of a UE 102 may comprise memory. The memory may be configurable to store the signal quality measurements. The memory may store one or more other elements and the apparatus may use them for performance of one or more operations. The apparatus may include processing circuitry, which may perform one or more operations (including but not limited to operation(s) of the method 800 and/or other methods described herein). The processing circuitry may include a baseband processor. The baseband circuitry and/or the processing circuitry may perform one or more operations described herein, including but not limited to determination of the signal quality measurements. The apparatus may include a transceiver to transmit the information related to the signal quality measurements. The transceiver may transmit and/or receive other blocks, messages and/or other element.

Figure 9:
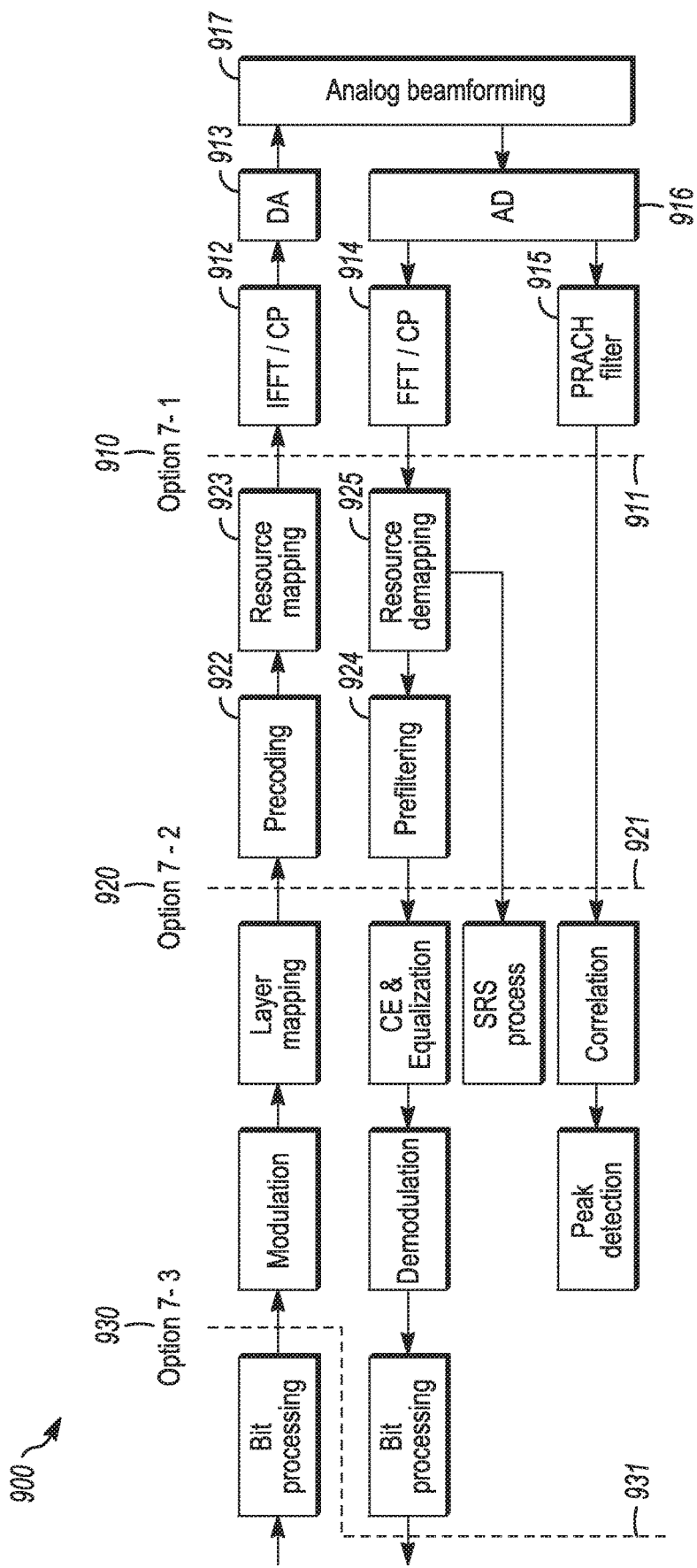
FIG. 9 illustrates example operations in accordance with some embodiments.
Figure 10:
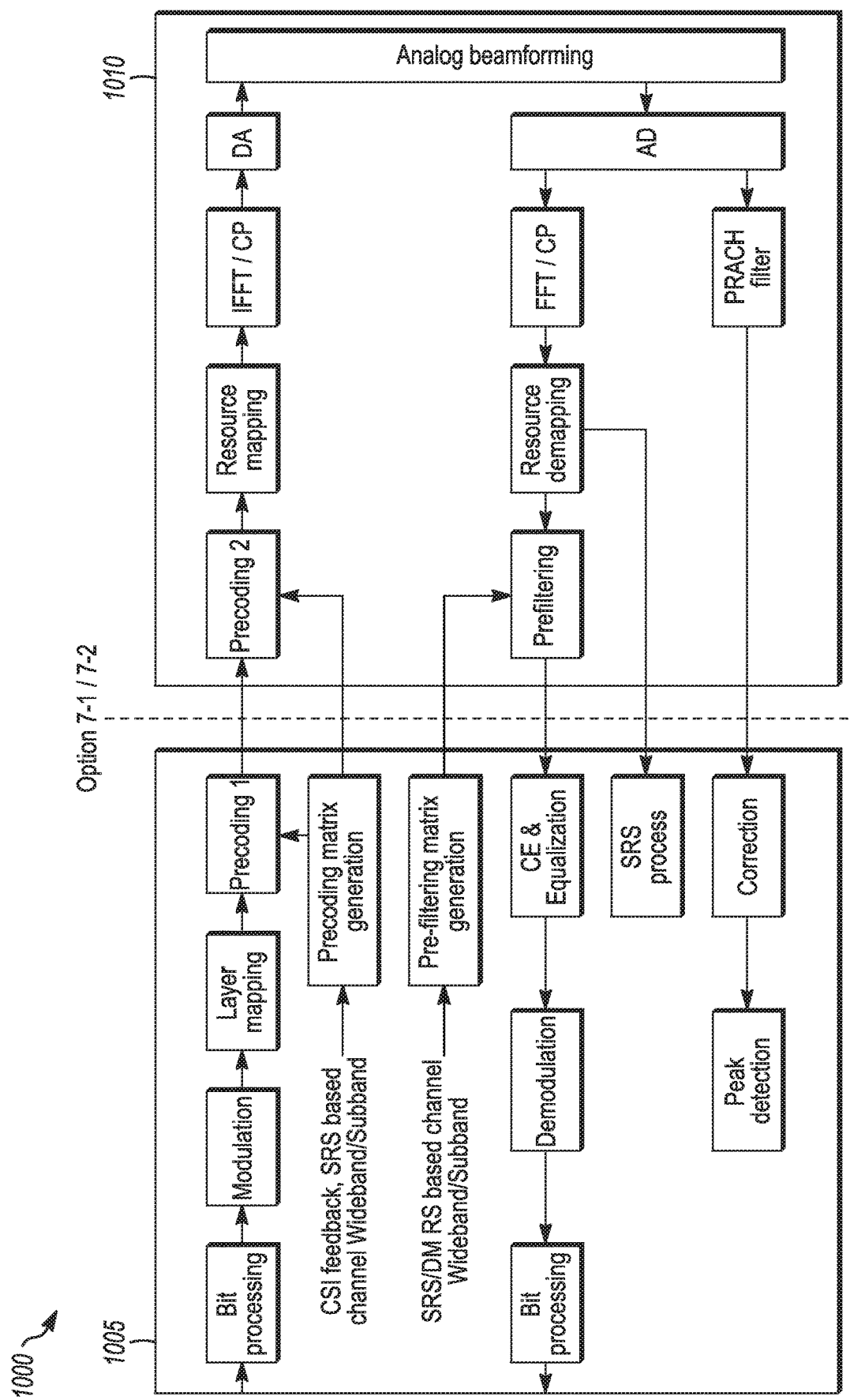
FIG. 10 illustrates additional example operations in accordance with some embodiments.

FIG. 9 illustrates example operations in accordance with some embodiments. FIG. 10 illustrates example operations in accordance with some embodiments. It should be noted that the examples shown in FIGS. 9-10 may illustrate some or all of the concepts and techniques described herein in some cases, but embodiments are not limited by the examples. For instance, embodiments are not limited by the name, number, type, size, ordering, arrangement of elements (such as devices, operations, messages and/or other elements) shown in FIGS. 9-10. Although some of the elements shown in the examples of FIGS. 9-10 may be included in a 3GPP LTE standard, 5G standard, NR standard and/or other standard, embodiments are not limited to usage of such elements that are included in standards.

In some embodiments, a functional split between a central unit (CU) and a distributed unit (DU) may be used. Referring to FIG. 9, three possible options 7-1, 7-2, and 7-3 are shown as (910, 920, 930). For each of the options 910, 920, 930, a dotted line is shown. The dotted lines 911, 921, 931 correspond to options 910, 920, 930, respectively. For each of options 910, 920, 930, the blocks to the left of the corresponding dotted line may be performed by the CU 106 and the blocks to the right of the corresponding dotted line may be performed by the DU 108. For instance, for option 7-1 (910), the IFFT/CP block 912, DA 913, FFT/CP 914, PRACH filter 915, AD 916, and analog beamforming 917 are to the right of the line 911. Those functions may be performed by the DU 108. Other blocks to the left of the line, such as precoding 922, resource mapping 923, prefiltering 924, resource demapping 925 and others to the left of those blocks may be performed by the CU 106 in option 7-1 (910). In another example, for option 7-2 (920), the blocks 912-917 and 922-925 are to the right of the line 921 and may be performed by the DU 108, while other blocks to the left of line 921 may be performed by the CU 106.

In some embodiments, a flexible front-haul interface design with a configurable function partition between CU 106 and DU 108 for split physical layer functionality may be used. In some embodiments, traffic load in the interface, including data and the coefficient, may be from the digital antenna port level to user stream level. This may depend on the capability of the transportation network, in some cases.

In some embodiments, a flexible front-haul design may support unified front-haul interface for physical layer split solution options 7-1 and 7-2. A non-limiting example is shown in FIG. 10. In some embodiments, the CU 106 may perform one or more operations included in 1005. In some embodiments, the DU 108 may perform one or more operations included in 1010.

The interface format can be unified and configured by CU 106 with different setup, such as number of digital antenna port/data stream, pre-coding and pre-filter coefficients generation and update frequency according to front-haul capability and performance target.

In some embodiments, a pre-filtering block may be used in the uplink. For instance, the pre-filtering may be used after an IFFT and/or FFT. In some embodiments, a pre-coding block may be used in the downlink. For instance, the pre-coding may be performed at the DU 108 before an FFT and/or IFFT. The DU 108 may perform operations related to data size, digital antenna number, data stream number and/or other in accordance with parameters and/or techniques setup by the CU 106.

In some embodiments, for the downlink, a precoding block may be separated into two precoding sub-blocks. One precoding operation may be performed by the CU 106 and the other precoding operation may be performed by the DU 108. The detail functionality of two sub-blocks may be controlled by the CU 106, in some embodiments.

In some cases, such an interface design may be flexible to support tradeoffs between the front-haul interface capability and wireless performance with a unified interface controlled by CU 106.

In some cases, one or more of the embodiments described herein may enable one or more of: a unified interface design for different physical layer solutions; flexibility to adjust the front-haul traffic from the digital antenna port level to user stream level according to the transportation capability without changing the functionality of the DU 108; pre-coding and pre-filtering functionality that may be controlled by the CU 106 and may not necessarily need input/intelligence/processing by the DU 108.

In some embodiments, two physical layer split option 7-1 and 7-2 may be unified with the same functionality in DU 108 and CU 106. To make the flexible interface design, more detail on different solutions for uplink and downlink is given below. For downlink, the traditional precoding may be separated to two functionalities, preceding 1 and preceding 2, which may be loaded in different units in some embodiments. The detailed preceding solution and coefficient may be generated and controlled by the CU 106. The precoding matrix can be generated according to different information, such as the CSI feedback (W1 & W2) by UEs 102, SRS based channel estimation from UL at CU 106 and/or other. Both the preceding 1 and 2 can be wideband, partial band and/or sub-band. The traffic in front-haul interface between two preceding blocks may be various from user stream level to digital antenna port level based on the precoding 2 final definition and the updating frequency.

In some embodiments, for the uplink, one or more of the following may be used: CP removal, FFT, resource mapping and/or other. Such operation(s) may be performed to decompose the data and SRS signal. A pre-filtering may be added at the DU 108 to downsize the data traffic in front-haul interface. The pre-filtering may be designed as a spatial filter according to channel statement information to downsize the receiving data from digital antenna port level to user stream level. The coefficient and updating frequency for pre-filtering will be controlled by CU 106.

In some embodiments, the digital antenna ports may be divided into several groups, and then pre-filtering may be performed within each group. The group number and the number of digital antenna ports per group can be configurable, so the virtual antenna port can be adjusted between the digital antenna ports and UE stream. This may be a tradeoff between system performance and link traffic.

In some embodiments, for uplink and downlink independently, the configuration of number of virtual antenna port may be indicated by the CU 106 and capability of maximum number of virtual antenna port in DU 108 may be known to CU 106. Then the following example can be used for DL preceding and UL pre-filtering.

In a non-limiting example, for the downlink, suppose the gNB 105 has $N_T$ transmitting digital antenna ports and serves $N_s$ data stream concurrently. Denote the transmit symbol of stream i as $x_i$. The final transmission signal over the digital antenna ports with two step precoding in frequency domain may be as follows—$Y=P_2P_1X$. The matrix $P_2$ may be of dimension $N_{TP} \times N_{VP}$. The matrix P1 may be a matrix of dimension $N_{VP} \times N_s$ for two steps' precoding individually. The vector $X=[x_1, x_2, \ldots, x_{Ns}]^T$ may be original transmit signals. The parameter $N_{VP}$ may be a number of virtual antenna ports after first step of precoding. The matrices $P_1$ and $P_2$ together may perform the whole digital beamforming. They may be generated from the feedback CSI, UL SRS based channel information by various algorithm(s) (including but not limited to zero-forcing, SVD and/or other) and/or other technique(s).

In some embodiments, the matrices $P_1$ and $P_2$ may be different. For PBCH, PDCCH, PSS/SSS and CSI-RS, wideband precoding or DFT based precoding may be used for wide coverage according to current discussion in 3GPP.

In some embodiments, for data channel and DMRS, the parameter $N_{VP}$ may be configurable to adjust the partition between $P_1$ and $P_2$. In an ideal front-haul transport network, $N_{VP}$ may be closer to $N_{TP}$. In some embodiments, when $N_{VP}$ is equal to $N_{TP}$, $P_2$ may be an identity matrix. This may result in a transparent transmission. All of the precoding work may be done by the CU 106. When the front-haul transport network is bad and/or performs poorly, $N_{VP}$ may be at least $N_s$, which means that $P_1$ may be an identity matrix, and the precoding may be performed entirely at the DU 108. The precoding coefficients may be transmitted from the CU 106. The granularity and frequency may depend on the front-haul capability. So the parameter $N_{VP}$ together with a method to determine $P_1$ and $P_2$ may be configurable with the same functionality and interface. This may be a compromise among system performance, link traffic and implementation complexity, in some cases.

In some embodiments, for the uplink, after resource de-mapping, the SRS symbol may be decomposed. In some embodiments, the SRS is not pre-filtered. The received PRACH signal may be processed separately, in some embodiments.

In some embodiments, for the data channel, the gNB 105 may include and/or be coupled to $N_{RP}$ receiving digital antenna ports and may serve N, data streams concurrently. Denote the corresponding channel frequency response between stream i and the antenna j element as $h_{i,j}$. The received frequency signal may be written as $Y=HX+n$. The matrix $H=[h_1, h_2, \ldots, h_{Ns}]$ of size $N_{RP}$ by $N_s$ may be a channel response matrix. The vector $h_i=[h_{i,1}, h_{i,2}, \ldots, h_{i,NRP}]^T$ may be a channel response vector. The vectors $X=[x_1, x_2, \ldots, x_{Ns}]^T$ and $n=[n_1, n_2, \ldots, n_{NRP}]^T$ may denote uplink transmit signals and noise, respectively. The pre-filtering matrix may be denoted as Pr and the pre-filtered data may be $Y_{prefiltered}=P_fY$.

In some embodiments, the antennas may be divided into $N_G$ groups, wherein $N_G$ can be flexibly configured (such as 1, 2, 4 and/or other value). The grouped antenna can be denoted as below.

$$H = \begin{bmatrix} H_{sub1} \\ H_{sub2} \\ \ldots \\ H_{subN_G} \end{bmatrix}$$

In the above, $H_{sub\ i}$ may include the channel information between all streams and partial receiving antenna ports. In addition, the digital antenna ports within each group may have no intersection, in some embodiments, and may be selected independently. Then the pre-filtering matrix can be expressed as below.

$$P_{f[N_GN_S \times N_{RP}]} = \text{diag}([\text{diag}(1/\text{sqrt}(\text{diag}(H_{sub\ i}{}^H H_{sub\ i})))]) \\ \text{diag}(H^H)$$

A dimension of data that is transferred in front-haul interface may be reduced from $N_{RP}$ to $N_G{*}N_s$. For instance, suppose $N_G=2$, and then the pre-filtering matrix $P_f$ can be denoted as below.

$$P_{f[2N_S \times N_{RP}]} = \\ \begin{bmatrix} \text{diag}(1/sqrt(\text{diag}(H_{sub1}^H H_{sub1}))) & 0 \\ 0 & \text{diag}(1/sqrt(\text{diag}(H_{sub2}^H H_{sub2}))) \end{bmatrix} \\ \begin{bmatrix} H_{sub1}^H & 0_{N_S \times N_{RP}/2} \\ 0_{N_S \times N_{RP}/2} & H_{sub2}^H \end{bmatrix}$$

The compressed data stream may be written as below.

$$Y_{prefiltered[2N_S \times 1]} = P_{f[2N_S \times N_{RP}]} \times Y$$

For this case, the dimension of data fed back may be reduced from $N_{RP}$ to $2N_s$. Processing may be based on the prefiltered received data of size $2N_s$. In some embodiments, packets for different content and fields in packet header may be used. Non-limiting examples are given in the table below.

| Direction | Packet type | Packet Content |
| --- | --- | --- |
| From DU to CU (UL) | UL Data packet | Pre-fitlered PUSCH/PUCCH |
| | SRS packet | Pre-filtered or non-pre-filtered SRS |
| | RACH packet | Pre-filtered or non-pre-filtered PRACH |
| From CU to DU (DL) | DL Data packet | Precoded PDSCH, PDCCH, DMRS |
| | Control packet | Precoded or non-precoded CSI-RS, SSS/PSS/PBCH |
| | Precoding matrix packet | DL precoding coefficient for P2 |
| | Pre-filtering matrix packet | UL pre-littering coefficient for pre-filter |

In some embodiments, field(s) for packet sub type may be used in the packet header for different content. In some embodiments, for a downlink data packet, a field may indicate NVP. In some embodiments, for downlink precoding, one or more fields may indicate information related to one or more of: $N_{VP}$ and $N_{TP}$, $P_2$ matrix size and/or other.

In some embodiments, for the uplink, $N_{VP}$ may be NG*N. This may be a dimension after pre-filtering. So for an uplink data packet, a field may indicate $N_{VP}$. For a prefiltering matrix packet, one or more fields may indicate information related to one or more of: $N_{VP}$, $N_{RP}$, a prefiltering matrix size and/or other.

In some embodiments, uplink pre-filtering and/or downlink precoding may be generated based on one or more of: DFT based beams, a covariance matrix based scheme and/or other. Hence, for a precoding configuration and/or pre-filtering configuration, one or more of the following elements may be indicated: a precoder/pre-filter generation scheme indicator; a granularity indication, such as one precoder/pre-filter per RB or per Precoding Resource block Group (PRG) or per RB Group (RBG) or per bandwidth part (BWP) or per carrier; a periodicity of precoder/pre-filter update; and/or other.

In some embodiments, a packet and/or header related to preceding and/or prefiltering ma include one or more of the following: a granularity index, such as a carrier index, RB/PRG/RBG/BWP index and/or other, one or more coefficients of a precoder for a corresponding resource, such as an angle of DFT based beam or coefficient for covariance matrix based scheme; and/or other.

In some embodiments, for a control packet, few ports will be enabled, and simpler scheme can be used. In some embodiments, the control packet may include a content indicator for SSS/PSS and PBCH. In some embodiments, for CSI-RS, an independent packet may be used. In some embodiments, the packet may be pre-generated. In some embodiments, the packet may be transmitted to DU 108 once and saved/transmitted by DU 108 on schedule. In some embodiments, the packet may be generated and transmitted from CU 106 to DU 108.

In some embodiments, a radio access system may include a CU 106 and a DU 108. Some functionality between the CU 106 and the DU 108 may be split inter physical layer. The CU 106 may transmit downlink signals to the DU 108 with multiple virtual antenna ports. Partial precoding may be performed at the DU 108. The CU 106 may receive uplink signals from the DU 106 with virtual antenna ports after pre-filtering at the DU 108.

In some embodiments, a number of virtual antenna ports may be configured by the CU 106. In some embodiments, the DU 108 may perform a mapping of the virtual antenna ports to digital antenna ports by precoding coefficient(s) transmitted from CU 106. In some embodiments, an angle of a DFT based precoder or covariance matrix of precoder may be indicated by CU 106. In some embodiments, a resource granularity of precoding coefficient(s) can be indicated by CU 106. In some embodiments, a precoding coefficient update periodicity can be configured by CU 106. In some embodiments, the DU may perform a mapping of the digital antenna ports to virtual antenna ports by pre-filtering coefficient(s) transmitted from CU 106. In some embodiments, a resource granularity of pre-filtering coefficient(s) may be indicated by CU 106. In some embodiments, a pre-filtering coefficient update periodicity may be configured by CU 106.

In some embodiments, an interface between CU 106 and DU 108 may be a unified packet based front-haul interface, covering lower layer split option 7-1, 7-2 and other split between these two options. In some embodiments, one or more fields of a packet may indicate one or more of: a content type, such as DL data packet, UL data packet, pre-filtering matrix packet, precoding matrix packet, control packet for CSI-RS, SS block and/or other. In some embodiments, one or more fields of the packet may indicate one or more of: a virtual antenna port number, a digital antenna port number and/or other.

In some embodiments, one or more fields of a packet may indicate one or more of: a resource granularity, an update periodicity of precoding coefficient matrix and/or other. In some embodiments, one or more fields of a packet may indicate one or more of: a resource granularity, an update periodicity of pre-filtering coefficient matrix and/or other.

In Example 1, a generation node B (gNB) may be configured with logical nodes including a gNB central unit (gNB-CU) and a gNB distributed unit (gNB-DU). The gNB-CU may be configured to communicate with the gNB-DU over an F1 interface. An apparatus of the gNB may comprise memory. The apparatus may further comprise processing circuitry. The processing circuitry may be configured to determine, by the gNB-CU, a first precoding matrix and a second precoding matrix for a precoding of one or more data streams for transmission on a plurality of antennas coupled to the gNB-DU. The precoding may be in accordance with a split functionality between the gNB-CU and the gNB-DU that includes: precoding by the gNB-CU with the first precoding matrix, and preceding by the gNB-DU with the second precoding matrix. The gNB-CU may be configured to precode first symbols from the data streams by the first precoding matrix to generate second symbols for transfer on the F1 interface to the gNB-DU. The gNB-DU may be configured to precede the second symbols by the second precoding matrix to generate third symbols for transmission on the antennas. The memory may be configured to store the first and second preceding matrixes.

In Example 2, the subject matter of Example 1, wherein the processing circuitry may be further configured to, by the gNB-CU, encode a precoding matrix packet that indicates the second precoding matrix, the precoding matrix packet encoded for transfer to the gNB-DU on the F1 interface.

In Example 3, the subject matter of one or any combination of Examples 1-2, wherein: a number of rows of the first precoding matrix may be equal to a configurable number of virtual ports, a number of columns of the first precoding matrix may be equal to a number of the data streams, a number of rows of the second precoding matrix may be equal to a number of the antennas, and a number of columns of the second precoding matrix may be equal to the number of virtual ports.

In Example 4, the subject matter of one or any combination of Examples 1-3, wherein the first symbols may include a first vector of length equal to the number of data streams. The second symbols may include a second vector of length equal to the number of virtual ports. The second vector may be based on a product of the first precoding matrix and the first vector. The third symbols may include a third vector of length equal to the number of antennas. The third vector may be based on a product of the second precoding matrix and the second vector.

In Example 5, the subject matter of one or any combination of Examples 1-4, wherein the first vector, the second vector, and the third vector may include symbols for transmission on a resource element (RE) of a plurality of REs during a symbol period of a plurality of symbol periods.

In Example 6, the subject matter of one or any combination of Examples 1-5, wherein the processing circuitry may be further configured to, by the gNB-CU, determine the number of virtual ports as a number that is less than the number of antennas to cause a size of the second symbols to be less than a size of the third symbols.

In Example 7, the subject matter of one or any combination of Examples 1-6, wherein the processing circuitry may be further configured to, by the gNB-CU, if the first symbols are included in a physical downlink shared channel (PDSCH), a physical downlink control channel (PDCCH) or demodulation reference signals (DMRSs): precode the first symbols by the first precoding matrix for transfer on the F1 interface to the gNB-DU.

In Example 8, the subject matter of one or any combination of Examples 1-7, wherein the processing circuitry may be further configured to, by the gNB-CU, if the first symbols are included in channel state information reference signals (CSI-RS), a primary synchronization signal (PSS), a secondary synchronization signal or a physical broadcast channel (PBCH): precode the first symbols by the first precoding matrix for transfer on the F1 interface to the gNB-DU; or transfer the first symbols without precoding on the F1 interface to the gNB-DU.

In Example 9, the subject matter of one or any combination of Examples 1-8, wherein the processing circuitry may be further configured to, by the gNB-CU, generate the first symbols based on a Fourier Transform (FT) operation on the one or more data streams.

In Example 10, the subject matter of one or any combination of Examples 1-9, wherein the processing circuitry may be further configured to, by the gNB-DU, decode a signal quality measurement from a User Equipment (UE). The processing circuitry may be further configured to, by the gNB-CU, based at least partly on the signal quality measurement: select the first precoding matrix from first candidate precoding matrixes; or select the second precoding matrix from second candidate precoding matrixes.

In Example 11, the subject matter of one or any combination of Examples 1-10, wherein the apparatus may further include a transceiver to transmit the third symbols.

In Example 12, the subject matter of one or any combination of Examples 1-11, wherein the apparatus may further include the antennas.

In Example 13, the subject matter of one or any combination of Examples 1-12, wherein the processing circuitry may include a baseband processor to determine the first and second preceding matrixes.

In Example 14, a generation Node-B (gNB) may be configured with logical nodes including a gNB central unit (gNB-CU) and a gNB distributed unit (gNB-DU), the gNB-CU configured to communicate with the gNB-DU over an F1 interface. A non-transitory computer-readable storage medium may store instructions for execution by one or more processors to perform operations for communication by the gNB. The operations may configure the one or more processors to, by the gNB-CU: precode, by a first precoding matrix, first data symbols from one or more data streams to generate second data symbols for transfer to the gNB-DU on the F1 interface. A size of the second data symbols may be based on a configurable number of virtual antenna ports. The operations may further configure the one or more processors to, by the gNB-CU, encode a precoding matrix packet for transfer to the gNB-DU on the F1 interface. The precoding matrix packet may indicate the number of virtual antenna ports. The operations may further configure the one or more processors to, by the gNB-DU, determine a second precoding matrix to convert the second data symbols into third data symbols of size based on a number of antennas coupled to the gNB-DU. A number of rows of the second preceding matrix may be equal to the number of antennas coupled to the gNB-DU. A number of columns of the second preceding matrix may be equal to the number of virtual antenna ports.

In Example 15, the subject matter of Example 14, wherein the operations may further configure the one or more processors to, by the gNB-DU: generate, for transmission to a User Equipment (UE), a plurality of precoded signals based on a plurality of candidate precoding matrixes; decode, from the UE, one or more signal quality measurements based on the plurality of precoded signals; and determine the second precoding matrix based on the signal quality measurements.

In Example 16, a generation node B (gNB) may be configured with logical nodes including a gNB central unit (gNB-CU) and a gNB distributed unit (gNB-DU). The gNB-CU may be configured to communicate with the gNB-DU over an F1 interface. An apparatus of the gNB may comprise memory. The apparatus may further comprise processing circuitry. The processing circuitry may be configured to, by the gNB-DU: decode, from the gNB-CU, a prefiltering matrix packet that indicates a number of virtual antenna ports. The processing circuitry may be further configured to, by the gNB-DU: determine a prefiltering matrix to convert first symbols received from a User Equipment (UE) on a plurality of antennas to second symbols for transfer to the gNB-CU on the F1 interface. A size of the first symbols may be based on a number of the antennas, and a size of the second symbols may be based on the number of virtual antenna ports. A number of rows of the prefiltering matrix may be equal to the number of virtual antenna ports, and a number of columns of the prefiltering matrix may be equal to the number of antennas. The memory may be configured to store the prefiltering matrix.

In Example 17, the subject matter of Example 16, wherein the processing circuitry may be further configured to, by the gNB-DU, prefilter first symbols from the antennas by the prefiltering matrix to generate second symbols for transfer on the F1 interface to the gNB-CU. The processing circuitry may be further configured to, by the gNB-CU, decode an uplink packet based on the second symbols.

In Example 18, the subject matter of one or any combination of Examples 16-17, wherein the first symbols may include a first vector of length equal to the number of antennas. The second symbols may include a second vector of length equal to the number of virtual antenna ports. The second vector may be based on a product of the prefiltering matrix and the first vector.

In Example 19, the subject matter of one or any combination of Examples 16-18, wherein the processing circuitry may be further configured to, by the gNB-CU, select the number of virtual antenna ports as less than the number of antennas to cause a size of the second symbols to be less than a size of the first symbols.

In Example 20, the subject matter of one or any combination of Examples 16-19, wherein the processing circuitry may be further configured to, by the gNB-DU, if the first symbols are included in a physical uplink shared channel (PUSCH) or a physical uplink control channel (PUCCH): prefilter the first symbols by the prefiltering matrix for transfer on the F1 interface to the gNB-CU.

In Example 21, the subject matter of one or any combination of Examples 16-20, wherein the processing circuitry may be further configured to, by the gNB-DU, if the first symbols are included in a sounding reference signal (SRS) or a random access channel (RACH): prefilter the first symbols by the prefiltering matrix for transfer on the F1 interface to the gNB-CU; or transfer the first symbols without prefiltering on the F1 interface to the gNB-CU.

In Example 22, the subject matter of one or any combination of Examples 16-21, wherein the processing circuitry may be further configured to, by the gNB-DU, generate the first symbols based on an inverse Fourier Transform (FT) operation on signals from the antennas.

In Example 23, the subject matter of one or any combination of Examples 16-22, wherein the processing circuitry may be further configured to, by the gNB-DU, decode a signal quality measurement from the UE. The processing circuitry may be further configured to, by the gNB-CU, select the prefiltering matrix from candidate prefiltering matrixes based at least partly on the signal quality measurement.

In Example 24, a generation Node-B (gNB) may be configured with logical nodes including a gNB central unit (gNB-CU) and a gNB distributed unit (gNB-DU). The gNB-CU may be configured to communicate with the gNB-DU over an F1 interface. An apparatus of the gNB may comprise means for, by the gNB-CU: precoding, by a first precoding matrix, first data symbols from one or more data streams to generate second data symbols for transfer to the gNB-DU on the F1 interface. A size of the second data symbols may be based on a configurable number of virtual antenna ports. The apparatus may further comprise means for, by the gNB-CU, encoding a precoding matrix packet for transfer to the gNB-DU on the F1 interface, wherein the precoding matrix packet indicates the number of virtual antenna ports. The apparatus may further comprise means for, by the gNB-DU, determining a second precoding matrix to convert the second data symbols into third data symbols of size based on a number of antennas coupled to the gNB-DU. A number of rows of the second precoding matrix may be equal to the number of antennas coupled to the gNB-DU. A number of columns of the second precoding matrix may be equal to the number of virtual antenna ports.

In Example 25, the subject matter of Example 24, wherein the apparatus may further comprise means for, by the gNB-DU: generating, for transmission to a User Equipment (UE), a plurality of precoded signals based on a plurality of candidate precoding matrixes; decoding, from the UE, one or more signal quality measurements based on the plurality of precoded signals: and determining the second precoding matrix based on the signal quality measurements.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a generation node B (gNB), the apparatus comprising:
  processing circuitry; and
  memory, the gNB configured with logical nodes including a gNB central unit (gNB-CU) and a gNB distributed unit (gNB-DU), the gNB-CU configured to communicate with the gNB-DU over an F1 interface, the processing circuitry configured to:
  determine, by the gNB-CU, a first precoding matrix and a second precoding matrix for a precoding of one or more data streams for transmission on a plurality of antennas coupled to the gNB-DU,
  wherein the precoding is in accordance with a split functionality between the gNB-CU and the gNB-DU, and includes:
  precoding by the gNB-CU with the first precoding matrix, and precoding by the gNB-DU with the second precoding matrix;
  wherein the gNB-CU is configured to precode first symbols from the one or more data streams by the first precoding matrix to generate second symbols for transfer on the F1 interface to the gNB-DU;
  wherein the gNB-DU is configured to precode the second symbols by the second precoding matrix to generate third symbols for transmission on the antennas,
  wherein:
  a number of rows of the first precoding matrix is equal to a configurable number of virtual ports,
  a number of columns of the first precoding matrix is equal to a number of the one or more data streams,
  a number of rows of the second precoding matrix is equal to a number of the antennas, and
  a number of columns of the second precoding matrix is equal to the configurable number of virtual ports, and
  wherein the memory is configured to store the first and second precoding matrices.

2. The apparatus according to claim 1, the processing circuitry further configured to:
  by the gNB-CU, encode a precoding matrix packet that indicates the second precoding matrix, wherein the precoding matrix packet is encoded for transfer to the gNB-DU on the F1 interface.

3. The apparatus according to claim 1, wherein:
  the first symbols include a first vector of length equal to the number of the one or more data streams;
  the second symbols include a second vector of length equal to the number of virtual ports, the second vector being based on a product of the first precoding matrix and the first vector; and
  the third symbols include a third vector of length equal to the number of antennas, the third vector being based on a product of the second precoding matrix and the second vector.

4. The apparatus according to claim 3, wherein the first vector, the second vector, and the third vector include symbols for transmission on a resource element (RE) of a plurality of REs during a symbol period of a plurality of symbol periods.

5. The apparatus according to claim 1, the processing circuitry further configured to:
  by the gNB-CU, determine the configurable number of virtual ports as a number that is less than the number of antennas to cause a size of the second symbols to be less than a size of the third symbols.

6. The apparatus according to claim 1, the processing circuitry further configured to:
  by the gNB-CU, if the first symbols are included in a physical downlink shared channel (PDSCH), a physical downlink control channel (PDCCH) or demodulation reference signals (DMRSs), precode the first symbols by the first precoding matrix for transfer on the F1 interface to the gNB-DU.

7. The apparatus according to claim 6, the processing circuitry further configured to:
  by the gNB-CU, if the first symbols are included in channel state information reference signals (CSI-RS), a primary synchronization signal (PSS), a secondary synchronization signal or a physical broadcast channel (PBCH):
  precode the first symbols by the first precoding matrix for transfer on the F1 interface to the gNB-DU; or
  transfer the first symbols without precoding on the F1 interface to the gNB-DU.

8. The apparatus according to claim 1, the processing circuitry further configured to:
  by the gNB-CU, generate the first symbols based on a Fourier Transform (FT) operation on the one or more data streams.

9. The apparatus according to claim 1, wherein the apparatus further includes a transceiver to transmit the third symbols.

10. The apparatus according to claim 9, wherein the apparatus further includes the antennas.

11. The apparatus according to claim 1, wherein the processing circuitry includes a baseband processor to determine the first and second precoding matrices.

12. An apparatus of a generation node B (gNB), the apparatus comprising:
processing circuitry;
and memory, the gNB configured with logical nodes including a gNB central unit (gNB-CU) and a gNB distributed unit (gNB-DU), the gNB-CU configured to communicate with the gNB-DU over an F1 interface, wherein the processing circuitry is configured to:
determine, by the gNB-CU, a first precoding matrix and a second precoding matrix for a precoding of one or more data streams for transmission on a plurality of antennas coupled to the gNB-DU,
wherein the precoding is in accordance with a split functionality between the gNB-CU and the gNB-DU, and includes:
precoding by the gNB-CU with the first precoding matrix, and precoding by the gNB-DU with the second precoding matrix;
wherein the gNB-CU is configured to precode first symbols from the one or more data streams by the first precoding matrix to generate second symbols for transfer on the F1 interface to the gNB-DU;
wherein the gNB-DU is configured to precode the second symbols by the second precoding matrix to generate third symbols for transmission on the antennas,
wherein the processing circuitry is further configured to:
by the gNB-DU, decode a signal quality measurement from a User Equipment (UE);
by the gNB-CU, based at least partly on the signal quality measurement:
select the first precoding matrix from first candidate precoding matrices; or
select the second precoding matrix from second candidate precoding matrices,
wherein the memory is configured to store the first and second precoding matrices.

13. A non-transitory computer-readable storage medium that stores instructions for communication by a generation Node-B (gNB), the gNB configured with logical nodes including a gNB central unit (gNB-CU) and a gNB distributed unit (gNB-DU), the gNB-CU configured to communicate with the gNB-DU over an F1 interface, wherein the instructions, when executed by the one or more processors, cause the one or more processors to:
by the gNB-CU, precode, by a first precoding matrix, first data symbols from one or more data streams to generate second data symbols for transfer to the gNB-DU on the F1 interface,
wherein a size of the second data symbols is based on a configurable number of virtual antenna ports;
by the gNB-CU, encode a precoding matrix packet for transfer to the gNB-DU on the F1 interface, wherein the precoding matrix packet indicates the configurable number of virtual antenna ports;
by the gNB-DU, determine a second precoding matrix to convert the second data symbols into third data symbols of size based on a number of antennas coupled to the gNB-DU,
wherein a number of rows of the second precoding matrix is equal to the number of antennas coupled to the gNB-DU,
wherein a number of columns of the second precoding matrix is equal to the configurable number of virtual antenna ports.

14. The non-transitory computer-readable storage medium according to claim 13, wherein the instructions, when executed by the one or more processors, further cause the one or more processors to:
by the gNB-DU:
generate, for transmission to a User Equipment (UE), a plurality of precoded signals based on a plurality of candidate precoding matrices;
decode, from the UE, one or more signal quality measurements based on the plurality of precoded signals; and
determine the second precoding matrix based on the signal quality measurements.

15. An apparatus of a generation node B (gNB), the apparatus comprising:
processing circuitry; and memory, the gNB configured with logical nodes including a gNB central unit (gNB-CU) and a gNB distributed unit (gNB-DU), the gNB-CU configured to communicate with the gNB-DU over an F1 interface, the processing circuitry configured to:
by the gNB-DU, decode, from the gNB-CU, a prefiltering matrix packet that indicates a number of virtual antenna ports;
by the gNB-DU, determine a prefiltering matrix to convert first symbols received from a User Equipment (UE) on a plurality of antennas to second symbols for transfer to the gNB-CU on the F1 interface, wherein a size of the first symbols is based on a number of the antennas, and a size of the second symbols is based on the number of virtual antenna ports,
wherein a number of rows of the prefiltering matrix is equal to the number of virtual antenna ports, and a number of columns of the prefiltering matrix is equal to the number of antennas,
wherein the memory is configured to store the prefiltering matrix.

16. The apparatus according to claim 15, the processing circuitry further configured to:
by the gNB-DU, prefilter the first symbols from the antennas by the prefiltering matrix to generate second symbols for transfer on the F1 interface to the gNB-CU;
by the gNB-CU, decode an uplink packet based on the second symbols.

17. The apparatus according to claim 16, wherein:
the first symbols include a first vector of length equal to the number of antennas,
the second symbols include a second vector of length equal to the number of virtual antenna ports, and
the second vector is based on a product of the prefiltering matrix and the first vector.

18. The apparatus according to claim 15, the processing circuitry further configured to:
by the gNB-CU, select the number of virtual antenna ports as less than the number of antennas to cause a size of the second symbols to be less than a size of the first symbols.

19. The apparatus according to claim 15, the processing circuitry further configured to:
by the gNB-DU, if the first symbols are included in a physical uplink shared channel (PUSCH) or a physical uplink control channel (PUCCH), prefilter the first symbols by the prefiltering matrix for transfer on the F1 interface to the gNB-CU.

20. The apparatus according to claim 19, the processing circuitry further configured to:
   by the gNB-DU, if the first symbols are included in a sounding reference signal (SRS) or a random access channel (RACH):
   prefilter the first symbols by the prefiltering matrix for transfer on the F1 interface to the gNB-CU; or
   transfer the first symbols without prefiltering on the F1 interface to the gNB-CU.

21. The apparatus according to claim 15, the processing circuitry further configured to:
   by the gNB-DU, generate the first symbols based on an inverse Fourier Transform (FT) operation on signals from the antennas.

22. The apparatus according to claim 15, the processing circuitry further configured to:
   by the gNB-DU, decode a signal quality measurement from the UE; and
   by the gNB-CU, select the prefiltering matrix from candidate prefiltering matrices based at least partly on the signal quality measurement.

* * * * *